(12) United States Patent
Iino et al.

(10) Patent No.: US 10,520,029 B2
(45) Date of Patent: Dec. 31, 2019

(54) STRUCTURE WITH THERMOPLASTIC ELASTOMER ENVELOPING LAYER, BEARING, AND DRIVE MODULE

(71) Applicant: SEIKO INSTRUMENTS INC., Chiba-shi, Chiba (JP)

(72) Inventors: Akihiro Iino, Chiba (JP); Yukihiro Nakayama, Chiba (JP); Hironobu Itoh, Chiba (JP); Tatsumi Yamada, Chiba (JP); Noritoshi Yuura, Chiba (JP); Haruhiko Hasegawa, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 15/953,070

(22) Filed: Apr. 13, 2018

(65) Prior Publication Data

US 2018/0306242 A1 Oct. 25, 2018

(30) Foreign Application Priority Data

Apr. 19, 2017 (JP) .................. 2017-082858
Aug. 2, 2017 (JP) .................. 2017-150236

(Continued)

(51) Int. Cl.
| | |
|---|---|
| *F16C 33/62* | (2006.01) |
| *F16C 19/06* | (2006.01) |
| *F16C 19/52* | (2006.01) |
| *F16C 13/00* | (2006.01) |

(Continued)

(52) U.S. Cl.
CPC ............ *F16C 33/62* (2013.01); *F16C 13/006* (2013.01); *F16C 19/527* (2013.01);
(Continued)

(58) Field of Classification Search
CPC ........ F16C 19/06; F16C 19/527; F16C 33/62; F16C 27/066; F16C 13/006; F16C 13/022;
(Continued)

(56) References Cited

U.S. PATENT DOCUMENTS 4,219,240 A * 8/1980 Brandenstein ......... A63C 17/22
152/323
4,403,812 A * 9/1983 Stephan ................ F16C 27/066
384/536

(Continued)

FOREIGN PATENT DOCUMENTS

GB 1589904 A * 5/1981 ............. B65G 39/02
JP 6087717 12/1994
(Continued)

*Primary Examiner* — Marcus Charles
(74) *Attorney, Agent, or Firm* — Adams & Wilks

(57) ABSTRACT

A structure includes an enveloping layer formed on one of a circular outer surface or a flat outer surface having irregularities, wherein the enveloping layer includes an outer circumferential surface layer formed by thermally fusing a thermoplastic elastomer. The enveloping layer has a first material layer provided on one of the outer surfaces and formed from an amorphos plastic, and a second material layer provided on the first material layer and formed from a thermoplastic elastomer selected from the group consisting of styrenes, olefins, polyvinyl chlorides, urethanes and polyesters.

21 Claims, 18 Drawing Sheets

(30) Foreign Application Priority Data

Dec. 26, 2017 (JP) ................................. 2017-250163
Dec. 26, 2017 (JP) ................................. 2017-250164

(51) Int. Cl.
　　　*B29C 33/40*　　　(2006.01)
　　　*B29C 45/14*　　　(2006.01)

(52) U.S. Cl.
　　　CPC ....... *B29C 33/405* (2013.01); *B29C 45/14311* (2013.01); *F16C 19/06* (2013.01); *F16C 2223/30* (2013.01); *F16C 2226/76* (2013.01); *F16C 2226/80* (2013.01)

(58) Field of Classification Search
　　　CPC ............ F16C 2226/76; F16C 2226/80; B29C 33/405; B29C 2045/14319; B29C 45/14311; F61C 33/586
　　　USPC ......... 384/58, 492, 536–537, 540, 543, 555, 384/581, 584, 587–588, 547; 193/37; 301/5.7; 525/191
　　　See application file for complete search history.

(56) References Cited

U.S. PATENT DOCUMENTS

| | | | | |
|---|---|---|---|---|
| 4,668,110 A | * | 5/1987 | Égeto | B65G 39/09 193/37 |
| 4,708,498 A | * | 11/1987 | Labedan | F16C 27/066 384/560 |
| 5,308,152 A | * | 5/1994 | Ho | A63C 17/06 152/323 |
| 5,785,166 A | * | 7/1998 | Hoefling | F16G 13/06 198/326 |
| 5,961,222 A | * | 10/1999 | Yabe | F16C 19/52 384/476 |
| 6,227,622 B1 | * | 5/2001 | Roderick | A63C 17/223 152/323 |
| 6,450,689 B1 | * | 9/2002 | Takatsu | B29C 45/14311 384/449 |
| 6,482,140 B1 | * | 11/2002 | Takatsu | B29C 45/14311 492/31 |
| 6,531,545 B1 | * | 3/2003 | Nakatsuji | B29C 43/006 525/191 |
| 6,715,925 B2 | * | 4/2004 | Pairone | D06F 37/00 384/536 |
| 2010/0326788 A1 | * | 12/2010 | Kamm | B65G 39/09 193/37 |

FOREIGN PATENT DOCUMENTS

| | | | | |
|---|---|---|---|---|
| JP | 2000203264 A | * | 7/2000 | ............. B29C 47/00 |
| JP | 2000291633 A | * | 10/2000 | ............. F16C 13/00 |
| JP | 2001153145 A | * | 6/2001 | .......... F16C 33/7896 |
| WO | WO-9509802 A1 | * | 4/1995 | ............. B66B 23/02 |

* cited by examiner

STRUCTURE WITH THERMOPLASTIC ELASTOMER ENVELOPING LAYER, BEARING, AND DRIVE MODULE

BACKGROUND OF THE INVENTION

Field of the Invention

The present invention relates to a structure with a thermoplastic elastomer enveloping layer, a bearing and a drive module.

CROSS REFERENCE TO RELATED APPLICATIONS

Priority is claimed on Japanese Patent Application No. 2017-082858, filed Apr. 19, 2017, Japanese Patent Application No. 2017-150236, filed Aug. 2, 2017, Japanese Patent Application No. 2017-250163, filed Dec. 26, 2017, and Japanese Patent Application No. 2017-250164, filed Dec. 26, 2017, the contents of which are incorporated herein by reference.

Description of Related Art

For example, as a use of a rolling bearing, conveying a conveyance object such as a bill, a ticket, or the like using an outer ring of the rolling bearing, or rolling the rolling bearing along a contact object as a wheel of a moving body is known. In this case, in order to increase a frictional force with a conveyance object or a contact object or decrease sound (noise) when an outer ring is operated while in rolling contact, an outer circumferential surface of the outer ring may be coated with a urethane rubber.

Urethane rubbers have excellent wear resistance and also can be strongly adhered and fixed to an outer ring. A manufacturing process of mounting a urethane rubber on an outer ring is as follows.

First, the outer circumferential surface of the outer ring of the rolling bearing is processed to become rough through sandblast processing, and an adhesive agent is applied on the outer circumferential surface that is processed to become rough. Next, the rolling bearing is set in a mold, a urethane raw material (a liquid) is injected between the outer circumferential surface and the mold, and molding is performed by applying pressure to the mold. Next, in the mold, the above structure is held at a high temperature for a predetermined time (about half of a day to one day according to hardness). In this way, the urethane rubber is cured at a high temperature, a high temperature is applied to the adhesive agent, and the urethane rubber is vulcanized and adhered to the outer circumferential surface. Further, after the vulcanized adhesion, an outer circumferential surface of the urethane is accurately finished with a predetermined dimension through polishing. Accordingly, the outer circumferential surface of the outer ring of the rolling bearing is coated with the urethane rubber (for example, refer to Patent Document 1).

CITATION LIST

Patent Documents

[Patent Document 1] Japanese Utility Model Publication No. H06-87717

SUMMARY OF THE INVENTION

However, the rolling bearing of the related art has the following problems.

That is, the urethane rubber should be cured in the mold for a long time. Further, application of the adhesive agent to the outer circumferential surface of the outer ring is time-consuming. Furthermore, the outer circumferential surface of the urethane should be accurately finished with a predetermined dimension through polishing after the curing of the urethane rubber.

Accordingly, when mass production of the rolling bearing having the outer circumferential surface coated with the urethane rubber is performed, a great amount of equipment for coating the outer circumferential surface with the urethane rubber should be provided, and equipment cost is increased. In addition, a process in which an outer circumferential surface of the outer ring is processed to become rough through sandblast or a process of applying an adhesive agent to the roughly processed outer circumferential surface is needed. For this reason, in the conventional method or apparatus, it is difficult to manufacture the rolling bearing coated with the urethane rubber at a low cost in large quantities.

The present invention has been made in consideration of such circumstances, and it is an object of the present invention to provide a bearing, a structure with a thermoplastic elastomer enveloping layer, and a drive module which can be manufactured at a low cost in large quantities.

A first aspect of the present invention provides a structure with a thermoplastic elastomer enveloping layer, including an enveloping layer formed on one of a circular outer surface and a flat outer surface having irregularities, wherein the enveloping layer includes an outer circumferential surface layer formed by thermally fusing a thermoplastic elastomer.

In other words, the first aspect of the present invention provides a structure with a thermoplastic elastomer enveloping layer, including at least one of a circular member and a flat member having at least one of a projecting portion and a recessed portion, and an enveloping layer formed on at least one of an outer surface of the circular member and an outer surface of the flat member having at least one of the projecting portion and the recessed portion, wherein the enveloping layer includes an outer circumferential surface layer formed by thermally fusing a thermoplastic elastomer, and the outer circumferential surface layer is a thermoplastic elastomer enveloping layer, which is a thermally fused layer which is made from the thermoplastic elastomer.

A second aspect of the present invention provides a bearing including an enveloping layer formed on an outer circumferential surface of an outer ring, wherein the enveloping layer includes a first material layer formed on the outer circumferential surface of the outer ring, and a second material layer which is an outer circumferential surface layer forming an outer circumferential surface of the enveloping layer which is formed by thermally fusing a thermoplastic elastomer on an outer surface of the first material layer, the second material layer is a material softer than the first material layer, and the first material layer includes an outer circumferential surface layer configured to cover the outer circumferential surface of the outer ring, and a pair of side surface layers connected to both axial sides of the outer circumferential surface layer and configured to cover both axial side surfaces of the outer ring.

In other words, the second aspect provides a bearing including an outer ring, and an enveloping layer formed on an outer circumferential surface of the outer ring, wherein the enveloping layer includes a first material layer formed on the outer circumferential surface of the outer ring, and a second material layer which is a thermoplastic elastomer layer thermally bonded to an outer surface of the first material layer and is an outer circumferential surface layer forming an outer circumferential surface of the enveloping layer, the second material layer is made of a material which is softer than the first material layer, the first material layer includes an outer circumferential surface layer configured to cover the outer circumferential surface of the outer ring, and a pair of side surface layers connected to both axial sides of the outer circumferential surface layer and configured to cover both axial side surfaces of the outer ring.

A third aspect of the present invention provides a drive module including the structure with a thermoplastic elastomer enveloping layer of the first aspect and/or the bearing of the second aspect.

According to the first aspect of the present invention, since the outer circumferential surface is formed by thermally bonding the thermoplastic elastomer, the outer circumferential surface layer can be firmly fixed by thermal bonding. Therefore, the structure with a thermoplastic elastomer enveloping layer, the bearing and the drive module can be manufactured at a low cost in large quantities.

According to the second aspect of the present invention, it is possible to provide the bearing having the enveloping layer and the drive module which are capable of being manufactured at a low cost in large quantities.

DETAILED DESCRIPTION OF THE INVENTION

Figure 1:
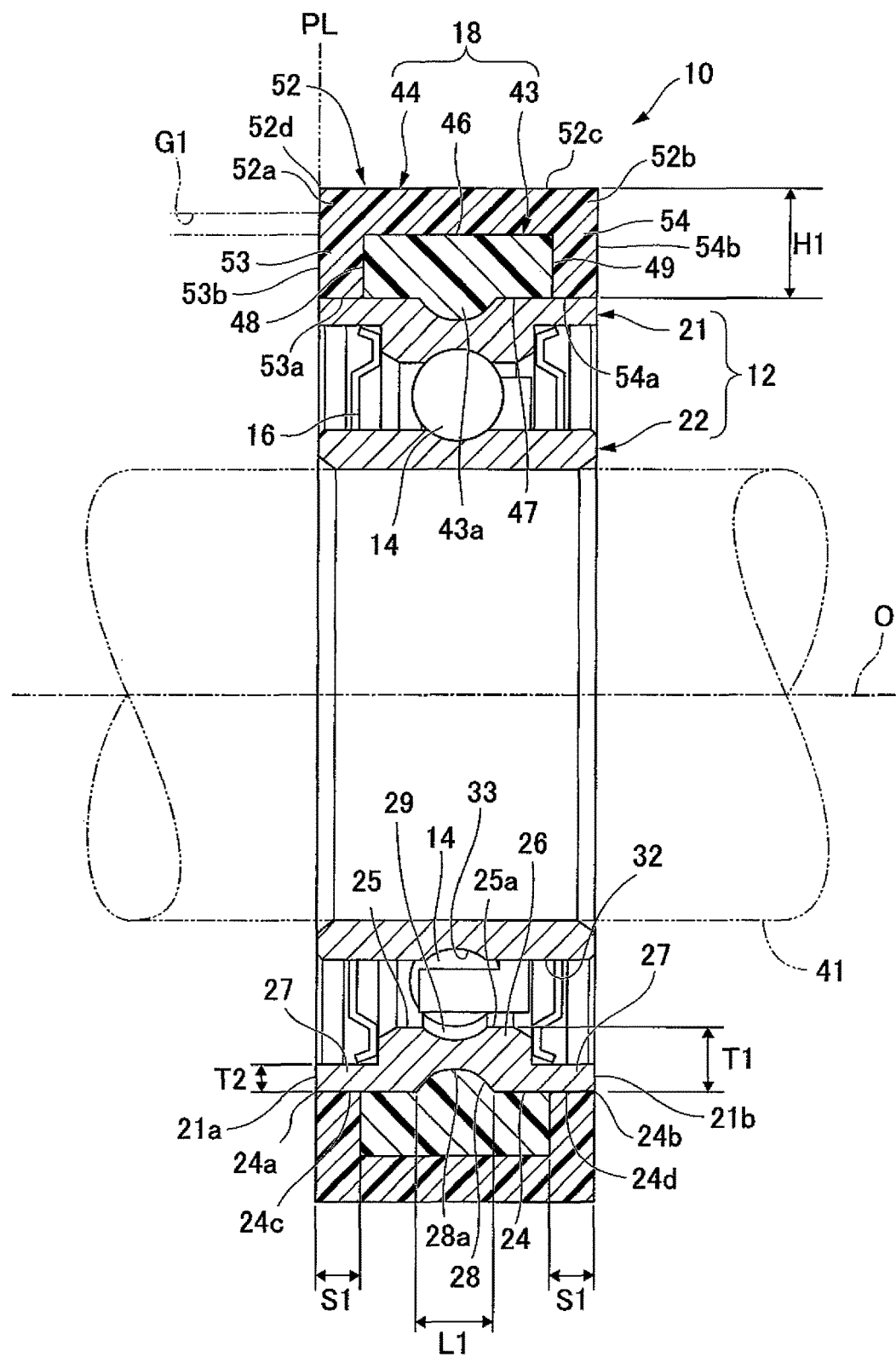
FIG. 1 is a schematic cross-sectional view showing a preferred example of a bearing as a structure with a thermoplastic elastomer enveloping layer according to a first embodiment of a first aspect of the present invention.

Hereinafter, preferable examples of first to third aspects of the present invention will be described with reference to the drawings. However, the present invention is not limited to only the following examples. For example, preferable elements or features may be appropriately combined in each aspect or in each embodiment within the scope not deviating from the present invention. Alternatively, they may be combined with other elements. Also, as long as there is no particular problem, numbers, numerical values, types, sizes, positions, shapes, characteristics, and so on may be exchanged, changed, omitted, or added.

(Structure with Thermoplastic Elastomer Enveloping Layer of First Aspect)

A structure with a thermoplastic elastomer enveloping layer according to a first aspect of the present invention solves the above-mentioned problem. The structure with the thermoplastic elastomer enveloping layer according to the first aspect of the present invention includes an enveloping layer formed on at least one of an outer surface formed in a circular shape (such as an annular shape having a curved surface, a cylindrical shape, a donut shape, or the like) and/or a flat outer surface having irregularities. The enveloping layer is characterized by including an outer circumferential surface layer formed by thermally fusing a thermoplastic elastomer (the thermoplastic elastomer enveloping layer, in other words, a layer obtained by thermally fusing and cooling a thermoplastic elastomer).

An outer circumferential surface is formed by thermally fusing and cooling a thermoplastic elastomer. Therefore, the formed outer circumferential surface layer can be firmly fixed to an object such as an object having a donut shape or the like by thermal bonding. Accordingly, it is possible to omit or eliminate a sandblast processing process and an adhesive coating process which is conventionally required for manufacturing the structure. Due to these features, the structure with the thermoplastic elastomer enveloping layer can be manufactured at a low cost in large quantities.

The enveloping layer includes a first material layer and a second material layer as an outer circumferential surface layer (thermally fused layer of the thermoplastic elastomer) on the above-described one outer surface, that is, at least one of the outer surface formed in a circular shape and the flat outer surface having irregularities. The second material layer forms an outer circumferential surface of the enveloping layer by thermally fusing the thermoplastic elastomer to the outer surface of the first material layer, and also the second material layer is preferably formed of a material which is softer than the first material layer.

In this constitution, the second material layer is formed using a material softer than the first material layer. Due to this constitution, a hard material can be used for the first material layer. Further, in the present invention, a soft material is a material having a bending modulus of elasticity and a hardness (for example, duro hardness A (durometer hardness A)) smaller than those of a hard material. A hard material is a material having a bending modulus of elasticity and a hardness (for example, duro hardness A (durometer hardness A)) larger than those of a soft material. The materials of the first material layer and the second material layer can be determined by comparing physical properties to each other.

The first material layer is formed in an annular shape by being formed on an outer surface which is a curved surface of a circle (circular member).

Therefore, when the first material layer is cooled and hardened, due to contraction of the first material layer, the first material layer can be firmly installed on an outer surface of a circle (circular object, annular object, and so on having a curved surface), such as an outer curved side surface. The first material layer can be locked on the irregularities of the flat outer surface by forming the first material layer on the flat outer surface having the irregularities. As described above, in the structure of the present invention, the first material layer can be firmly fixed to the outer surface formed in a circle or the flat outer surface having the irregularities.

Further, the second material layer can be firmly fixed to the first material layer by thermal bonding using a material softer than the first material layer as the second material layer.

As described above, the second material layer can be firmly fixed to the circular outer surface or the outer surface having the irregularities via the first material layer by interposing the rigid first material layer firmly fixed to the circular outer surface or the outer surface having the irregularities between the outer surface and the second material layer.

Furthermore, the second material layer can be firmly fixed to the circular outer surface or the flat outer surface having the irregularities via the first material layer by thermal bonding to the first material layer. Therefore, it is possible to omit or eliminate the sandblasting processing process or the adhesive coating process which is conventionally required. Accordingly, the structure with the thermoplastic elastomer enveloping layer can be manufactured at a low cost in large quantities.

Further, in the present invention, a material which is softer than the first material layer is preferably used as the second material layer. Due to such a constitution, when a conveyance object such as a bill, a ticket, or the like is transported using an outer ring of a bearing (that is, the second material layer), or when the bearing is rolled along a contact object as a wheel of a moving body, sound (noise) can be reduced by an effect of the second material layer.

In the above-described aspect, the circular outer surface of a circular element may be the outer circumferential surface of the outer ring provided in the bearing.

According to such a constitution, the second material layer can be firmly fixed to the outer circumferential surface of the outer ring provided in the bearing via the first material layer. Therefore, in such a constitution, it is possible to prevent the second material layer from being separated from the outer circumferential surface of the outer ring (that is, the bearing).

In the above-described aspect, a groove portion extending in a circumferential direction may be provided in advance on the outer circumferential surface of the outer ring.

Due to such a constitution, since the groove portion (concave and/or recessed portion) is provided on the outer circumferential surface, the groove portion can also be filled with the first material layer. Further, a shape of the groove can be arbitrarily selected. For example, a cross section of the groove may be a curved surface, a semicircular shape, a substantially semicircular shape, square shape, trapezoidal shape or the like. A part of the first material layer is filled as a protruding portion (convex and/or projecting portion) in the groove portion of the outer circumferential surface due to filling according to the shape of the groove portion. As a result, it is possible to engage the groove portion on the outer circumferential surface with the protruding portion of the first material layer in a concavo-convex shape. Therefore, it is possible to adopt a constitution in which the first material layer is not separated from the outer ring due to the engagement of the recessed portion and the projecting portion provided between the outer circumferential surface and the first material layer even when a force is applied to the first material layer. Due to such a structure, it is possible to more reliably prevent the first material layer and the second material layer from being separated from the outer circumferential surface of the outer ring (that is, the bearing).

In the above-described aspect, the second material layer may include a plurality of layers, specifically, an outer circumferential surface layer which covers an outer surface of the first material layer, and a pair of side surface layers which are connected to the outer circumferential surface layer and cover both axial side surfaces of the first material layer. The plurality of layers may be one layer formed as an integral unit.

According to such a constitution, both side surfaces of the first material layer are sandwiched between the pair of side surface layers by forming the pair of side surface layers in the second material layer. As a result, when the second material layer is formed, the layer cools and contracts, and thus both side surfaces of the first material layer can be sandwiched (pinched) by the pair of side surface layers. As a result, the second material layer can be more firmly engaged with the first material layer. Additionally, it is possible to more reliably prevent the second material layer from being separated from the outer circumferential surface (that is, the outer ring).

In the above-described aspect, the pair of side surface layers of the second material layer may be in contact with the outer circumferential surface of the outer ring.

According to such a constitution, a large height dimension of the pair of side surface layers, that is, a length of the pair of side surface layers, can be secured by bringing the pair of side surface layers of the second material layer into contact with the outer circumferential surface of the outer ring. Therefore, it is possible to secure a large contact area of the side surface layer with respect to the side surface of the first material layer. Due to such a constitution, both side surfaces of the first material layer can be sandwiched between the pair of side surface layers by cooling and contracting the second material layer. As a result, the second material layer can be more firmly engaged with the first material layer.

In the above-described aspect, at least a part of the first material layer may be formed so that a width dimension thereof gradually increases from the outer circumferential surface toward an outer side in a radial direction. For example, when seen from a cross section thereof, the first material layer may be a first material layer in which the distance between the side surface and the side surface of the first material layer gradually increases toward the outer side in the radial direction, or may be a first material layer having a portion in which the distance gradually increases.

According to such a constitution, the second material layer can be more firmly fixed to the first material layer by gradually increasing the width dimension of the first material layer toward the outer side in the radial direction. As a result, it is possible to more reliably prevent the second material layer from being separated from the outer circumferential surface (that is, the outer ring).

In the above-described aspect, the first material layer may be formed of a thermoplastic elastomer.

According to such a constitution, when the first material layer is formed of the thermoplastic elastomer which is the same material as that of the second material layer, the first material layer and the second material layer can be thermally bonded more preferably strongly.

As a result, it is possible to more firmly fix the second material layer to the first material layer and to more reliably prevent the second material layer from being separated from the outer circumferential surface (that is, the outer ring).

In the above-described aspect, the circular outer surface may be an outer circumferential surface of the outer ring provided in the bearing, and the outer ring may be formed of amorphous plastic. The enveloping layer may be a layer formed by thermally fusing the thermoplastic elastomer on the outer circumferential surface of the outer ring.

According to such a constitution, since the outer ring is formed of the amorphous plastic (hard plastic), the enveloping layer of the thermoplastic elastomer can be formed directly on the outer ring formed of the amorphous plastic to be firmly fixed. Therefore, the first material layer can be removed, and the constitution can be simplified.

In the above-described aspect, the second material layer may be formed of a thermoplastic elastomer filled from a gate. When the gate is used for forming the second material layer, the gate may be preferably formed to have an opening larger than a thickness dimension of the second material layer in a radial direction of the bearing and may also be disposed to overlap both the first material layer and the second material layer in an axial direction, that is, to overlap at least a part of each layer as seen from the axial direction.

According to the manufacturing apparatus or the manufacturing method of the structure or the bearing having such a constitution, the opening of the gate is formed to be large, and the gate is also disposed to overlap both the first material layer and the second material layer. Due to these characteristics, even when the thickness dimension of the second material layer is reduced, the second material layer can be satisfactorily formed.

Further, it is possible to fill the outer surface of the first material layer (specifically, the first side surface layer) with a thermoplastic elastomer at a large pressure. Due to such an effect, it is possible to enhance adhesion between both layers of the first material layer and the second material layer.

In order to solve the above-described problem, a drive module according to a third aspect of the present invention is characterized by including the structure with a thermoplastic elastomer enveloping layer.

According to such a constitution, since the above-described structure with a thermoplastic elastomer enveloping layer is provided in the drive module, it is possible to ensure durability and to manufacture the drive module at a low cost.

Preferred Embodiments of First Aspect

Hereinafter, preferred embodiments of the first aspect of the present invention will be described with reference to the drawings. In first to sixth embodiments, structures with a thermoplastic elastomer enveloping layer will be described as bearings 10, 70, 90, 110, 130 and 140.

First Embodiment

FIG. 1 is a schematic cross-sectional view of a bearing 10 according to a first embodiment.

As shown in FIG. 1, the bearing 10 is a rolling bearing including a ring body 12, a plurality of rolling elements 14, a retainer 16 and an enveloping layer 18.

The ring body 12 includes an outer ring 21 and an inner ring 22. The outer ring 21 and the inner ring 22 are disposed coaxially with an axis O of the bearing 10, that is, disposed to have the same axis. The inner ring 22 is disposed inside the outer ring 21 in a radial direction.

The plurality of rolling elements 14 are annularly disposed between the outer ring 21 and the inner ring 22 which constitute the ring body 12. The retainer 16 holds the plurality of rolling elements 14 rollably in a state in which the rolling elements 14 are evenly arranged in a circumferential direction.

The outer ring 21 may be formed of an arbitrarily selected material, and for example, is formed of a metal material such as stainless steel. The outer ring 21 is a cylindrical member, in other words, it may have a shape such as a short tube shape or a circular ring shape. The outer ring 21 can be formed by an arbitrarily selected method and is formed, for example, by forging, mechanical processing, or the like. The outer ring 21 has an outer circumferential surface (that is, an outer surface formed in a circular shape) 24, an inner circumferential surface 25, a central portion 26 and a pair of outer side portions 27.

The outer circumferential surface 24 is a surface formed annularly on an outer side of the outer ring 21 in the radial direction. The inner circumferential surface 25 is a surface annularly formed inside the outer ring 21 in the radial direction. The central portion 26 is formed at a center of the inner circumferential surface 25 of the outer ring 21 in the axis O direction. The central portion 26 is formed so that an area 25*a* of the inner circumferential surface 25 at a center in the axis O direction is disposed inside from the outer circumferential surface 24 of the outer ring 21 in the radial direction at an interval T1. In other words, the distance from the outer circumferential surface 24 to a surface of the central portion 26 provided on the inner circumferential surface 25 is T1. A concave portion serving as a groove portion 28 extending in a circumferential direction is preferably formed in a portion of the outer circumferential surface 24 corresponding to a position of the central portion 26, in other words, a portion of the outer circumferential surface 24 facing the central portion 26.

The groove portion 28 of the outer circumferential surface 24 has a deepest area 28a disposed further inside than the outer circumferential surface 24 in the radial direction. The deepest area 28a is a deepest area in the groove portion 28. The groove portion 28 is formed so that a groove width dimension L1 is gradually reduced from the outer circumferential surface 24 side toward the deepest area 28a in a cross-sectional shape thereof.

As an example, the groove portion 28 is located at a center of the outer ring 21 in the axis O direction and is formed so that a cross-sectional shape thereof is a curved surface and opens outside the outer ring 21 in the radial direction. The groove portion 28 is formed in a shape which is symmetrical with respect to a center of the outer ring 21 in the axis O direction.

The pair of outer side portions 27 of the outer ring 21 are located further outside in the axis O direction from the central portion 26 and formed symmetrically with respect to a center of the outer ring 21 in the axis O direction. The pair of outer side portions 27 are formed so that an area of the inner circumferential surface 25 outside in the axis O direction is disposed inside from the outer circumferential surface 24 of the outer ring 21 in the radial direction at an interval T2. In other words, the pair of outer side portions 27 are located outside from the central portion 26 in the axis O direction, and the distance from the outer circumferential surface 24 to a surface of the outer side portion 27 is T2. The interval T1 (height T1) of the central portion 26 is set to be larger than the interval T2 (height T2) of the pair of outer side portions 27. That is, a thickness dimension of the central portion 26 is larger than a thickness dimension of the pair of outer side portions 27.

An outer ring rolling surface 29 is formed in the area 25a of the central portion 26 in the inner circumferential surface 25 of the outer ring 21. The outer ring rolling surface 29 is formed so that a cross section of a side surface is formed in an arc shape along outer surfaces of the rolling elements 14.

A radius of curvature in a cross section of the outer ring rolling surface 29 is set to be substantially the same as or slightly larger than a radius of curvature of the outer surfaces of the rolling elements 14. The outer ring rolling surface 29 is formed on the entire circumference of the inner circumferential surface 25 of the outer ring 21. The outer surfaces of the plurality of rolling elements 14 can be brought into contact with the outer ring rolling surface 29.

The outer ring rolling surface 29 is formed at a center of the inner circumferential surface 25 in the axis O direction. The outer ring rolling surface 29 is disposed at a position overlapping the groove portion 28 of the outer circumferential surface 24 in the radial direction.

However, the groove portion 28 is formed at a center of the outer circumferential surface 24 in the axis O direction and is disposed at a position overlapping the outer ring rolling surface 29 of the inner circumferential surface 25 in the radial direction of the outer circumferential surface 24. The groove portion 28 has a cross sectional shape formed in a curved surface shape. Accordingly, an influence of deformation of the outer ring 21 or a decrease in rigidity of the outer ring 21 due to the groove portion 28 on the outer ring rolling surface 29 can be minimized.

Further, as the cross-sectional shape of the groove portion 28 is formed to have the curved surface shape, a bottom surface of the groove portion 28 has no flat portion. Accordingly, when the groove portion 28 is processed using a cutting edge, a cutting resistance of the cutting edge can be minimized to a small level, and processing of the groove portion 28 becomes easy. Further, a lifespan of the cutting edge can be extended by minimizing the cutting resistance of the cutting edge to a small level.

In addition, the groove portion 28 is formed in a symmetrical shape with respect to a center of the outer ring 21 in the axis O direction. The groove portion 28 is formed at a center of the outer circumferential surface 24 of the outer ring 21 with good balance. Accordingly, the influence of the deformation of the outer ring 21 or the decrease in rigidity of the outer ring 21 due to the groove portion 28 on the outer ring rolling surface 29 can be more appropriately minimized.

Here, the groove portion 28 is formed at a center of the outer ring 21 in the axis O direction, and the outer ring rolling surface 29 is also formed at a center of the outer ring 21 in the axis O direction. Due to such a constitution, an influence of the deformation due to heat treatment such as quenching or the like on the outer ring 21 can be minimized to a small level. In particular, the outer ring 21 is formed so that a thickness dimension of the central portion 26 is larger than a thickness dimension of the pair of outer side portions 27. The groove portion 28 is formed in an area of the central portion 26 of the outer ring 21 in which the thickness dimension is large, that is on the outer circumferential surface side of the above-described portion. Due to such a constitution, the thickness dimension in which the groove portion 28 is formed can be secured.

Further, the groove portion 28 has a cross-sectional shape which is a curved surface shape. Meanwhile, the outer ring rolling surface 29 also has a cross-sectional shape which is a curved surface shape. That is, preferably, the groove portion 28 is formed in the same shape as the outer ring rolling surface 29. Accordingly, the influence of the deformation due to heat treatment such as quenching or the like on the outer ring 21 can be further minimized to a smaller level.

Further, in the first embodiment, the example in which the groove portion 28 is formed so that the cross-sectional shape thereof is a curved surface has been described. However, the shape is not limited thereto, and as another example, it may be formed so that a cross-sectional shape thereof is a V-shaped surface, a U-shaped surface or the like. Even when the groove portion 28 is formed so that the cross-sectional shape is the V-shaped surface, the U-shaped surface or the like, the same effect can be obtained although a degree thereof may be different from that in the first embodiment.

The inner ring 22 may be formed of an arbitrarily selected material, and for example, is formed of a metal material such as stainless steel. The inner ring 22 is a substantially cylindrical member having a predetermined thickness dimension in the axis O direction. The inner ring 22 may be formed by an arbitrarily selected method and is formed, for example, by forging, mechanical processing, or the like. The inner ring 22 has an inner circumferential surface and an outer circumferential surface.

An inner ring rolling surface 33 is formed at an intermediate portion of an outer circumferential surface 32 of the inner ring 22 in the axis O direction. The inner ring rolling surface 33 is formed so that a cross section of a side surface is formed in an arc shape along the outer surfaces of the rolling elements 14. A radius of curvature of the cross section of the inner ring rolling surface 33 is set to be substantially the same as or slightly larger than the radius of curvature of the outer surfaces of the rolling elements 14. The inner ring rolling surface 33 is formed on the entire circumference of the outer circumferential surface 32 of the inner ring 22. The outer surfaces of the plurality of rolling elements 14 can be brought into contact with the inner ring rolling surface 33.

As the inner ring 22 of the bearing 10 is fixed to a support shaft 41, the enveloping layer 18 rotates with the outer ring 21. A coated outer circumferential surface 52c of the enveloping layer 18 (second material layer 44) may be a surface which conveys, for example, a bill, a ticket, or the like, or rolls on a contact object 5 (refer to FIG. 4).

The rolling elements 14 are formed of an arbitrarily selected material, for example, a metal material such as stainless steel or a ceramic material such as zirconia or the like in a spherical shape. The plurality of rolling elements 14 are disposed between the outer ring rolling surface 29 of the outer ring 21 and the inner ring rolling surface 33 of the inner ring 22. The rolling elements 14 roll along the outer ring rolling surface 29 and the inner ring rolling surface 33. The plurality of rolling elements 14 are evenly and annularly arranged by the retainer 16 in the circumferential direction to be able to roll. Grease for lubrication is sealed on the bearing 10.

The enveloping layer 18 is formed on the outer circumferential surface 24 of the outer ring 21 of the bearing 10. The enveloping layer 18 includes a first material layer 43 and a second material layer 44. The second material layer 44 forms an outer circumferential surface layer of the enveloping layer 18.

(First Material Layer)

The first material layer 43 is formed at a center of the outer circumferential surface 24 of the outer ring 21 in the axis O direction by an arbitrarily selected method, for example, preferably by insert molding through injection molding. The first material layer 43 has a first outer circumferential surface 46, a first inner circumferential surface 47, and a pair of side surfaces 48 and 49. Hereinafter, one of the pair of side surfaces 48 and 49 is referred to as a first side surface 48, and the other side surface is referred to as a second side surface 49.

The first inner circumferential surface 47 is welded to the outer circumferential surface 24 and the groove portion 28 of the outer ring 21 preferably by insert molding. The first outer circumferential surface 46 is formed in an arc shape or an annular shape to have a predetermined thickness dimension with respect to the outer circumferential surface 24 of the outer ring 21. That is, the first outer circumferential surface 46 is formed in a linear shape to be parallel to the axis O in the axis O direction of the bearing 10.

The first side surface 48 is a surface which connects one end of the first outer circumferential surface 46 and one end of the first inner circumferential surface 47 and is also formed to intersect the axis O direction of the bearing 10. The first side surface 48 is formed at a position which is spaced from a first end edge 24a of the outer circumferential surface 24 in the axis O direction at an interval S1, that is, at a position which is spaced from the first end edge 24a of the outer circumferential surface 24 to the center side at the interval S1. The second side surface 49 is formed at a position which is spaced from a second end edge 24b of the outer circumferential surface 24 in the axis O direction at the interval S1, that is, at a position which is spaced from the second end edge 24b of the outer circumferential surface 24 to the center side at the interval S1.

The first material layer 43 is formed of an arbitrarily selected material and is formed of, for example, a hard plastic. It is particularly preferable for the first material layer 43 to be formed of an amorphous plastic because it is excellent in thermal adhesiveness to a thermoplastic elastomer. As an example of the amorphous plastic, polycarbonate, ABS resin, or an alloy material of polycarbonate and ABS resin, or the like is preferable. When the first material layer 43 is cooled, a force is applied by the first material layer 43 so that the first material layer 43 comes into close contact with the outer circumferential surface 24 toward a center of the outer ring 21 (in the radial direction). Therefore, the first material layer 43 is more securely welded to the outer circumferential surface 24 and the groove portion 28 of the outer ring 21 by injection molding.

The first material layer 43 is preferably formed in an annular shape of a hard plastic along the outer circumferential surface 24.

Therefore, the first material layer 43 is firmly installed on the outer circumferential surface 24 by contraction when the first material layer 43 is cooled and hardened.

The groove portion 28 is also filled with the first material layer 43. Since the groove portion 28 of the outer circumferential surface 24 is filled with a protruding portion 43a of the first material layer 43, the groove portion 28 of the outer circumferential surface 24 and the protruding portion 43a of the first material layer 43 can be engaged in a concavo-convex shape.

Here, when the first material layer 43 is insert-molded on the outer circumferential surface 24 and the groove portion 28 of the outer ring 21, it is preferable for the bearing 10 to be accommodated in a molding die and for at least end surfaces 21a and 21b of the outer ring 21 in the axis O direction to be supported in contact with the molding die. In this way, the first material layer 43 is insert-molded on the outer circumferential surface 24 and the groove portion 28 of the outer ring 21 by supporting the end surfaces 21a and 21b with the molding die. Further, the first material layer 43 may be insert-molded to a simple body of the outer ring 21.

In addition, as the groove portion 28 is filled with the protruding portion 43a of the first material layer 43, the protruding portion 43a filled in the groove portion 28 serves as an anchor. Accordingly, the first material layer 43 can be firmly fixed to the outer circumferential surface 24 and the groove portion 28 of the outer ring 21.

In a state in which the first material layer 43 is provided on the outer circumferential surface 24 of the outer ring 21, a first side portion 24c and a second side portion 24d located on both sides of the outer circumferential surface 24 in the axis O direction of the first material layer 43 are exposed to the outside.

(Second Material Layer)

The second material layer 44 is formed on the first material layer 43 and on the first side portion 24c and the second side portion 24d of the outer circumferential surface 24. The second material layer 44 has an outer circumferential surface layer 52 and a pair of side surface layers 53 and 54. Hereinafter, one of the pair of side surface layers 53 and 54 is referred to as a first side surface layer 53, and the other side surface layer is referred to as a second side surface layer 54.

The outer circumferential surface layer 52 is a layer which covers the first outer circumferential surface 46 of the first material layer 43. The outer circumferential surface layer 52 has one end portion 52a and the other end portion 52b. The first side surface layer 53 is a layer which is connected to one end portion 52a of the outer circumferential surface layer 52 and covers the first side surface 48 of the first material layer 43. The first side surface layer 53 is also in contact with the first side portion 24c of the outer circumferential surface 24 of the outer ring 21.

The second side surface layer 54 is a layer which is connected to the other end portion 52b of the outer circumferential surface layer 52 and covers the second side surface 49 of the first material layer 43. The second side surface layer 54 is also in contact with the second side portion 24d of the outer circumferential surface 24 of the outer ring 21.

That is, both side surfaces (the first side surface 48 and the second side surface 49) of the first material layer 43 are sandwiched between the first side surface layer 53 and the second side surface layer 54 of the second material layer 44.

The second material layer 44 is formed of a thermoplastic elastomer (TPE). The thermoplastic elastomer is excellent in thermal adhesiveness to an amorphous plastic which is a preferred material of the first material layer 43.

For example, styrenes (TPS), olefins (TPO), polyvinyl chlorides (PPVC), urethanes (TPU) or polyesters (TPEE) may be applied as the thermoplastic elastomer. In view of mechanical strength and wear resistance, urethanes (TPU), polyesters (TPEE) and styrenes (TPS) are preferable. More preferably, polyesters (TPEE) are exemplary examples of the thermoplastic elastomer.

While urethanes (TPU) have the most excellent wear resistance, a forming property is slightly deteriorated, and sufficient drying is necessary due to high hygroscopicity. Further, annealing is also necessary, and forming accuracy is also slightly degraded while manufacture thereof is time-consuming. However, among thermoplastic elastomers, urethanes have the most excellent mechanical strength and wear resistance. For this reason, preferably, urethanes are used in the enveloping layer 18 when properties such as mechanical strength, wear resistance, or the like are necessary.

Among thermoplastic elastomers, aside from urethanes, polyesters (TPEE) are the most excellent in wear resistance and mechanical strength and also excellent in thermal adhesiveness to hard plastics or the like. In addition, polyesters (TPEE) are optimal as a material for the enveloping layer 18 because the hygroscopicity is also low and the forming property is also good.

Here, as the thermoplastic elastomer of the second material layer 44, polyesters (TPEE) are more preferable. Polyesters are excellent in wear resistance and mechanical strength and also excellent in thermal adhesiveness to hard plastics (that is, the first material layer 43).

Thermal bonding refers to, for example, when the thermoplastic elastomer of the second material layer 44 is molten by heating and adhered to the hard plastic (first material layer 43).

Therefore, it is effective at the time of two color molding (different material molding). Further, polyesters (TPEE) are optimal as a material for the second material layer 44 of the bearing 10 because hygroscopicity is also low and a forming property is also good.

In view of suppression of sound (noise), duro hardness A (durometer hardness A) of the second material layer 44 is desirably 75 to 95. For example, when the duro hardness A is 92, it is particularly preferable in view of the fact that the sound (noise) is appropriately suppressed and the mechanical strength or the wear resistance of the second material layer 44 is appropriately secured. When the duro hardness A is equal to or more than 75, the mechanical strength and the wear resistance of the second material layer 44 does not become a problem.

The thermoplastic elastomer of the second material layer 44 is a material softer than the amorphous plastic (hard plastic) of the first material layer 43. That is, a hard amorphous plastic can be used for the first material layer 43. In this case, the first material layer 43 is injection-molded in a molten state on the outer circumferential surface 24 of the outer ring 21, and after the injection molding, the first material layer 43 in the molten state cools and solidifies, and thus the annular first material layer 43 contracts. Therefore, the first material layer 43 can be firmly fixed to the outer circumferential surface 24 of the outer ring 21.

The soft material is a material of which a bending modulus of elasticity and/or a hardness (for example, duro hardness A (durometer hardness A)) is smaller than that of the amorphous plastic of the first material layer 43.

The hard material is a material of which a bending modulus of elasticity and a hardness (for example, duro hardness A (durometer hardness A)) are larger than those of the thermoplastic elastomer of the second material layer 44.

Further, since the groove portion 28 is provided in the outer circumferential surface 24 of the outer ring 21, the groove portion 28 can be also filled with the first material layer 43. The groove portion 28 of the outer circumferential surface 24 and the protruding portion 43a of the first material layer 43 can be engaged with each other by filling the groove portion 28 of the outer circumferential surface 24 with the first material layer 43, that is, the protruding portion 43a of the first material layer 43. That is, they can be engaged in a concavo-convex shape by a recessed portion of the outer circumferential surface 24 and a projecting portion of the first material layer 43. Therefore, when a force is applied to the first material layer 43, the first material layer 43 can be prevented from being separated from the outer ring 21 due to the recessed portion and the projecting portion of the outer circumferential surface 24 and the first material layer 43.

Here, the second material layer 44 is formed annularly along the first material layer 43, and the second material layer 44 is formed of a material softer than the first material layer 43. Therefore, when the second material layer 44 is formed on the first material layer 43 by injection molding (two-color formation), it can be more strongly thermally bonded.

Further, both side surfaces (the first side surface 48 and the second side surface 49) of the first material layer 43 are sandwiched by the first side surface layer 53 and the second side surface layer 54 of the second material layer 44. Therefore, as the second material layer 44 is cooled and contracted after the injection molding, the first side surface 48 and the second side surface 49 of the first material layer 43 can be sandwiched between the first side surface layer 53 and the second side surface layer 54 of the second material layer 44.

Accordingly, the second material layer 44 can be more firmly engaged with the first material layer 43.

Further, an inner circumferential surface 53a of the first side surface layer 53 of the second material layer 44 is welded to a surface of the first side portion 24c of the outer circumferential surface 24 of the outer ring 21. An inner circumferential surface 54a of the second side surface layer 54 of the second material layer 44 is welded to a surface of the second side portion 24d of the outer circumferential surface 24 of the outer ring 21. That is, in the first side surface layer 53 and the second side surface layer 54, a large height dimension H1 thereof is secured.

Therefore, a large contact area of the first side surface layer 53 of the second material layer 44 with respect to the first side surface 48 of the first material layer 43 is secured. Similarly, a large contact area of the second side surface layer 54 with respect to the second side surface 49 is secured. Due to such a constitution, as the second material layer 44 is cooled and contracted, the entire region of the first side surface 48 and the second side surface 49 of the first material layer 43 can be sandwiched between the first side surface layer 53 and the second side surface layer 54. As a result, the second material layer 44 can be more firmly engaged with the first material layer 43. Accordingly, even when a force in the axis O direction or a force in a direction to be turned from the outer circumferential surface 24 of the outer ring 21 is applied to the second material layer 44, the second material layer 44 can be made less likely to separate from the outer circumferential surface 24 of the outer ring 21.

As described above, since the hard first material layer 43 is interposed between the outer circumferential surface 24 of the outer ring 21 and the second material layer 44, the second material layer 44 can be firmly engaged with the outer circumferential surface 24 of the outer ring 21 via the first material layer 43. Accordingly, the first material layer 43 and the second material layer 44 can be prevented from being separated from the outer circumferential surface 24 of the outer ring 21.

Further, since the second material layer 44 can be firmly engaged with the outer circumferential surface 24 of the outer ring 21 via the first material layer 43, it is possible to eliminate the necessity of a sandblast processing process and a process of applying an adhesive agent which have been conventionally required.

Furthermore, even when the first material layer 43 and the second material layer 44 are injection-molded by, for example, two color molding, it is unnecessary to harden the amorphous plastic of the first material layer 43 and the thermoplastic elastomer of the second material layer 44 over a long period of time in a mold unlike urethane rubber. That is, when the first material layer 43 and the second material layer 44 are injection-molded, a long hardening process in the mold can be unnecessary unlike urethane rubber.

Accordingly, the bearing 10 in which the enveloping layer 18 (the first material layer 43 and the second material layer 44) is formed on the outer circumferential surface 24 of the outer ring 21 can be manufactured inexpensively in large quantities.

As described above, the first material layer 43 and the second material layer 44 of the enveloping layer 18 are formed, for example, by two color molding. As an example of a specific manufacturing method, the first material layer 43 is insert-molded on the outer circumferential surface 24 of the outer ring 21 by injection molding of an amorphous plastic. Next, after the first material layer 43 is insert-molded, the second material layer 44 is insert-molded by injection molding of a thermoplastic elastomer. To injection-mold the first material layer 43 or the second material layer 44, a mold is used. In particular, as a mold for injection-molding the second material layer 44, for example, a gate G1 used for filling is preferably disposed at a position corresponding to the first side surface layer 53 of the second material layer 44. A mold with such a gate G1 is preferably used. As an inside (cavity) of the mold from the gate G1 is filled with the molten thermoplastic elastomer, the second material layer 44 is insert-molded on the first material layer 43 and the first side portion 24c and the second side portion 24d of the outer circumferential surface 24.

A filling place of the thermoplastic elastomer can be shifted from a position of the coated outer circumferential surface 52c of the outer circumferential surface layer 52 by providing the gate G1 of the mold at a position corresponding to the first side surface layer 53.

Further, a parting line PL of the mold which is a division line of the mold is preferably located, for example, at a position of an outer surface 53b of the first side surface layer 53 in the axis O direction of the bearing 10. The outer surface 53b of the first side surface layer 53 is formed in a vertical or concave shape at one end 52d of the coated outer circumferential surface 52c with respect to the coated outer circumferential surface 52c of the outer circumferential surface layer 52. The parting line PL of the mold is disposed at a position shifted from the coated outer circumferential surface 52c of the outer circumferential surface layer 52.

In this way, as the gate G1 or the parting line PL is shifted from the coated outer circumferential surface 52c of the outer circumferential surface layer 52, it is possible to prevent burrs generated when the inside of the mold is filled with the thermoplastic elastomer from the gate G1, burrs generated by the parting line PL, or the like from occurring on the coated outer circumferential surface 52c of the outer circumferential surface layer 52. Accordingly, it is possible to remove the necessity of post processing for removing burrs from the coated outer circumferential surface 52c of the outer circumferential surface layer 52.

Here, the distance between the outer surface 53b of the first side surface layer 53 and an outer surface 54b of the second side surface layer 54 is a width dimension of the enveloping layer 18. The width dimension of the enveloping layer 18 is set to be equal to a width dimension of the ring body 12.

Incidentally, the mold temperature when the amorphous plastic or the thermoplastic elastomer is injection-molded is minimized to a low level of 150° C. or less (preferably, 100° C. or less). In addition, when the inside of the mold is filled with the melted amorphous plastic or thermoplastic elastomer from the gate G1, the amorphous plastic or the thermoplastic elastomer is solidified instantaneously. Accordingly, when the melted amorphous plastic or thermoplastic elastomer is molded, it is possible to prevent a high temperature from being transmitted to the grease sealed on the bearing 10. Accordingly, there is no concern of deterioration of the grease due to the temperature of the melted amorphous plastic or thermoplastic elastomer.

Since the enveloping layer 18 (the first material layer 43 and the second material layer 44) can be welded to the outer circumferential surface 24, there is no need to bond the enveloping layer 18 to the outer circumferential surface 24 using an adhesive agent. The following effect is obtained when no adhesive agent is interposed between the enveloping layer 18 and the outer circumferential surface 24.

That is, in the case of a small bearing, for example, when an enveloping layer is bonded to an outer circumferential surface by an adhesive agent, the adhesive agent may not be applied on the outer circumferential surface of the outer ring with a uniform thickness dimension due to painting nonuniformity of the adhesive agent. Further, in the case of the small bearing, the thickness dimension of the enveloping layer is considered to be smaller than 1.0 mm. In this state, when the adhesive agent is not applied on the outer circumferential surface with a uniform thickness dimension, hardness of the enveloping layer is considered to become irregular.

For this reason, when a conveyance object is conveyed by a small bearing coated with such an enveloping layer or when an enveloping layer of the small bearing rolls along a contact object, sound (noise) may be generated, or torque nonuniformity may be caused.

On the other hand, as the enveloping layer 18 (the first material layer 43 and the second material layer 44) is welded to the outer circumferential surface 24, the adhesive agent may be unnecessary. Due to such properties, even when the bearing 10 is small and the thickness dimension of the enveloping layer 18 is smaller than 1.0 mm, hardness of the enveloping layer 18 can be evenly maintained throughout the circumference.

As a result, even in a case in which the bearing 10 is formed in a compact size, generation of sound (noise) or causing of torque nonuniformity can be minimized when a conveyance object is conveyed by the bearing 10 or when the bearing 10 is rolled along a contact object.

Further, the example in which the enveloping layer 18 (the first material layer 43 and the second material layer 44) is provided on the outer circumferential surface 24 only by welding has been described in the first embodiment. However, the enveloping layer 18 may be provided on the outer circumferential surface 24 using, for example, an adhesive agent in combination with welding according to a use of the bearing 10.

The example in which polycarbonate or the like is used as the hard plastic (amorphous plastic) for the first material layer 43 of the enveloping layer 18 has been described in the first embodiment. However, for example, a thermoplastic elastomer may be used for the first material layer 43, like the second material layer 44.

In this case, the first material layer 43 and the second material layer 44 can be thermally bonded more satisfactorily. In this case, it is possible to more firmly fix the second material layer 44 to the first material layer 43 and thus to more reliably prevent the second material layer 44 from being separated from the outer circumferential surface 24 of the outer ring 21.

Figure 2:
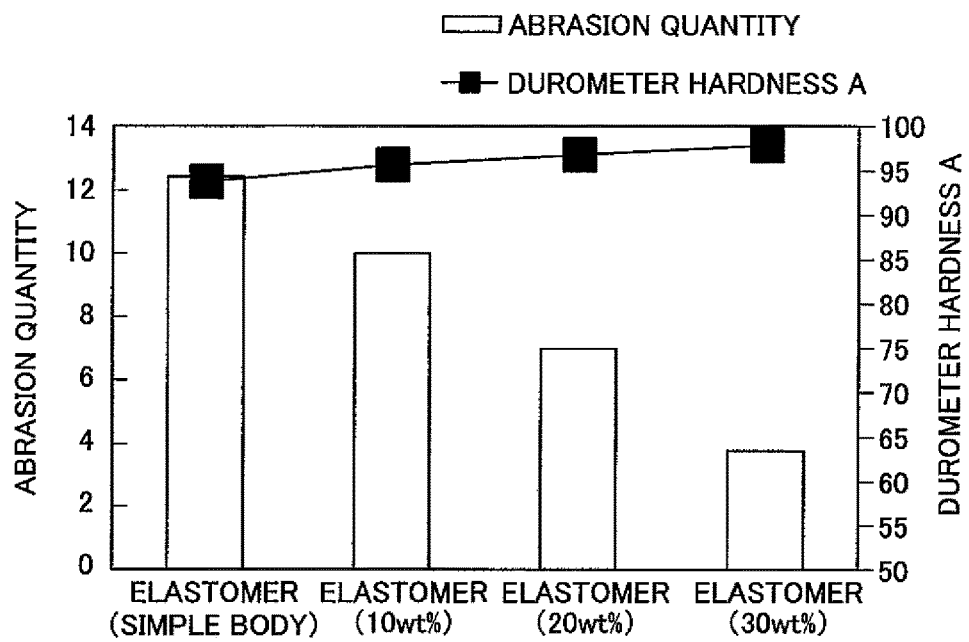
FIG. 2 is a graph showing properties of a state in which potassium titanate fibers are added in a thermoplastic elastomer which is usable for a second material layer according to the first embodiments of the first and second aspects of the present invention.

Here, for example, in order to secure a small abrasion quantity, that is, a small abrasion loss of the second material layer 44, the thermoplastic elastomer may contain a potassium titanate fiber as shown in Table 1 and FIG. 2.

Table 1 is a table showing properties (tensile strength, bending strength, bending modulus of elasticity, hod notch, duro hardness A, abrasion quantity) of a composition when the potassium titanate fiber is not contained in the thermoplastic elastomer and when the potassium titanate fiber is contained. Specifically, it shows results of inspecting the properties of the composition to predict properties of a state in which the potassium titanate fiber is contained in the thermoplastic elastomer of the second material layer 44 of the bearing or structure of the present invention. FIG. 2 is a graph showing the duro hardness A and abrasion quantity vs glass plate described in Table 1 and is a graph showing properties of a state in which the potassium titanate fiber is contained in the second material layer 44.

In Table 1 and FIG. 2, the thermoplastic elastomer (polyester (TPEE)) which does not contain the potassium titanate fiber is shown as an elastomer (a simple body). The thermoplastic elastomer which contains the potassium titanate fiber at 10 wt % is shown as an elastomer (10 wt %).

In addition, the thermoplastic elastomer which contains the potassium titanate fiber at 20 wt % is shown as an elastomer (20 wt %). The thermoplastic elastomer which contains the potassium titanate fiber at 30 wt % is shown as an elastomer (30 wt %).

TABLE 1

|  |  | Elastomer (Single body) | Elastomer (10 wt %) | Elastomer (20 wt %) | Elastomer (30 wt %) |
| --- | --- | --- | --- | --- | --- |
| Tensile strength | MPa | 12 | 13 | 18 | 23 |
| Bending strength | MPa | 4 | 7 | 9 | 16 |
| Bending modulus of elasticity | Gpa | 0.05 | 0.13 | 0.21 | 0.44 |
| Izod notch | J/m | NB (Not broken) | NB (Not broken) | 158 | 208 |
| Duro hardness A |  | 94 | 96 | 97 | 98 |
| Abrasion loss vs glass plate | $10^{-3}$ cm$^3$ | 12.5 | 10.1 | 7.0 | 3.8 |

In Table 1 and FIG. 2, properties of the elastomer (simple body), the elastomer (10 wt %), the elastomer (20 wt %) and the elastomer (30 wt %) are shown.

When the thermoplastic elastomer contains the potassium titanate fibers of 10 wt %, 20 wt % and 30 wt %, the tensile strength can be increased from the 12 MPa of the case in which the potassium titanate fibers are not contained, to 13 MPa, 18 MPa and 23 MPa.

In addition, the bending strength can be increased from the 4 MPa of the case in which the potassium titanate fibers are not contained, to 7 MPa, 9 MPa and 16 MPa. Further, the bending modulus of elasticity can be increased from the 0.05 GPa of the case in which the potassium titanate fibers are not contained, to 0.13 GPa, 0.21 GPa and 0.44 GPa.

Further, as described above, the graph of FIG. 2 shows abrasion quantity and durometer hardness A in a state in which the thermoplastic elastomer is formed as a simple body and when the thermoplastic elastomer contains the potassium titanate fibers at 10 wt %, 20 wt % or 30 wt %. As shown in FIG. 2 and Table 1, in a state in which the thermoplastic elastomer contains the potassium titanate fiber at 10 wt %, 20 wt % or 30 wt %, the durometer hardness A of the thermoplastic elastomer can also be substantially secured from 94 to 96, 97 and 98.

Further, as shown in FIG. 2 and Table 1, in a state in which the thermoplastic elastomer contains the potassium titanate fiber at 10 wt %, 20 wt % or 30 wt %, the abrasion quantity of the thermoplastic elastomer can be reduced from 12.5× $10^{-3}$ cm$^3$ to 10.1× $10^{-3}$ cm$^3$, 7.0× $10^{-3}$ cm$^3$ and 3.8× $10^{-3}$ cm$^3$.

Here, the abrasion quantity of the thermoplastic elastomer is measured by a reciprocal sliding test. In a reciprocal sliding test condition, a glass plate is selected as an opposite material, and a reciprocal sliding test is performed at a weight of 0.7 kg and a speed of 0.16 m/s for a time of 20 min.

Further, the amount of the potassium titanate fiber is appropriately selected to correspond to a use of the bearing 10.

Modified Example

Next, a modified example of the bearing 10 of the first embodiment will be described.

Figure 3:
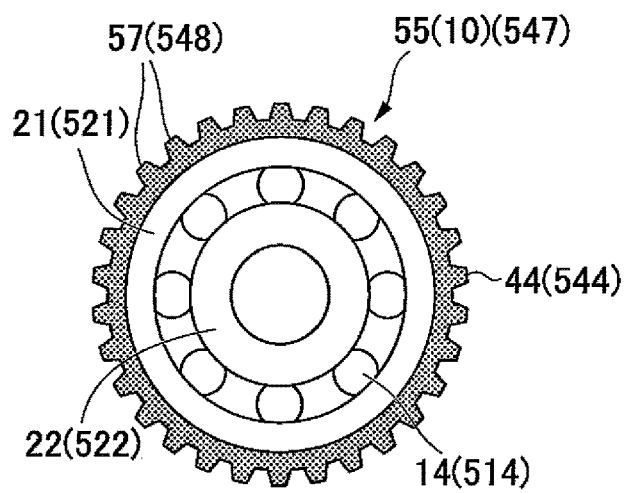
FIG. 3 is a schematic side view showing a modified example of the bearing according to the first embodiments of the first and second aspects of the present invention.

FIG. 3 is a side view showing the modified example of the bearing according to the first embodiment.

The example in which the second material layer 44 is formed smoothly of a thermoplastic elastomer has been described as the bearing 10 of the first embodiment. However, as shown in FIG. 3, as another example, it is also possible to form a plurality of gear teeth 57 on the coated outer circumferential surface of the second material layer 44. Accordingly, it is possible to use the bearing 10 as a gear 55. For example, the gear 55 may be used as a small planetary gear (planetary gear) inside a planetary gear mechanism.

In the gear 55, the plurality of teeth 57 are formed of a thermoplastic elastomer. Due to such a constitution, it is possible to reduce driving sound generated when the gear 55 meshes.

Furthermore, a thermoplastic elastomer having duro hardness A exceeding 95 may be used for the second material layer 44 forming the plurality of teeth 57 in consideration of abrasion loss, mechanical strength, or the like of the gear 55.

Figure 4:
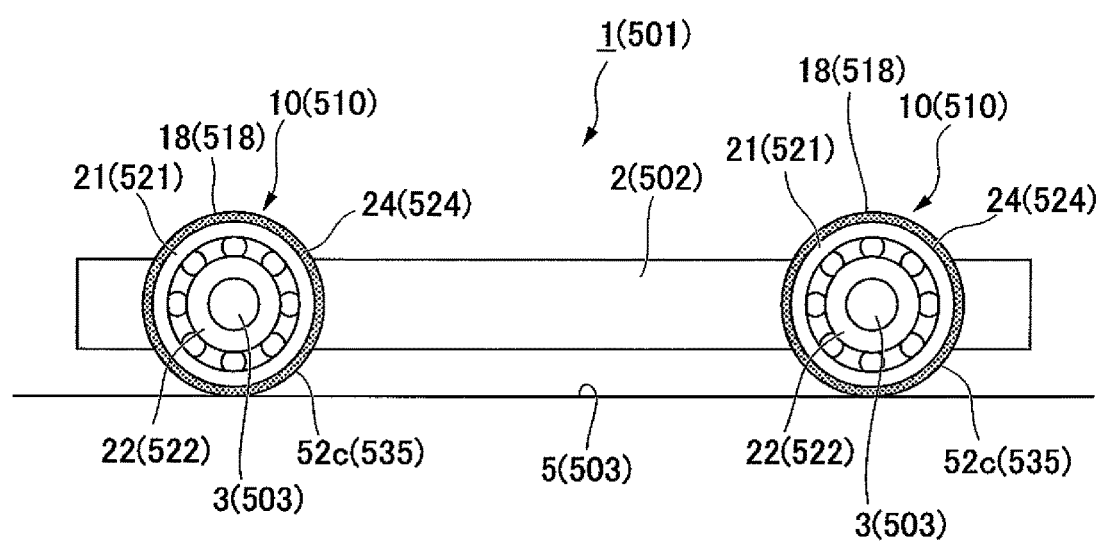
FIG. 4 is a schematic side view showing a preferred example of a moving body including the bearing according to the first embodiments of the first and second aspects of the present invention.

Next, an example of a use of the bearing 10 of the first embodiment will be described with reference to FIG. 4. FIG. 4 is a side view showing a moving body 1 including the bearing 10 according to the first embodiment.

As shown in FIG. 4, for example, the bearing 10 is installed in the moving body (a drive module) 1 and used as a wheel. The moving body 1 includes a main body portion 2, and the plurality of bearings 10 installed on both sides of the main body portion 2. The plurality of bearings 10 are fixed by installing the inner ring 22 at a support shaft 3.

The support shaft 3 is installed at the main body portion 2. As the inner ring 22 is fixed to the support shaft 3, the outer ring 21 and the enveloping layer 18 are rotatably supported by the support shaft 3. That is, the plurality of bearings 10 are used as wheels.

The moving body 1 is disposed in a state in which the enveloping layer 18 (specifically, the second material layer 44) of the plurality of bearings 10 is in contact with the contact object 5. The second material layer 44 is formed of a thermoplastic elastomer. As the outer ring 21 having the enveloping layer 18 of the bearing 10 roll on the contact object 5, the moving body 1 can move along the contact object 5.

Since the enveloping layer 18 is formed on the outer ring 21, when the bearing 10 moves while rolling on the contact object 5, sound (noise) can be reduced by the enveloping layer 18 (particularly, the second material layer 44). In addition, since the enveloping layer 18 is strongly engaged with the outer circumferential surface 24 of the outer ring 21, separation of the enveloping layer 18 from the outer circumferential surface 24 of the outer ring 21 can be prevented.

In this way, since the plurality of bearings 10 are provided in the moving body 1, the moving body 1 can be obtained at a low cost while durability can be secured.

The example in which the enveloping layer 18 of the bearing 10 is rotated while in contact with the contact object 5 and the moving body 1 is moved along the contact object 5 has been described in FIG. 4. However, the present invention is not limited thereto. As another example, the contact object 5 may be moved. Specifically, the moving body 1 may be maintained in a fixed state, and the contact object 5 may also be moved according to rotation of the outer ring 21 having the enveloping layer 18 by bringing the enveloping layer 18 in contact with the contact object 5. In this case, for example, in the case of a drawer in a desk, a case in which the drawer is the contact object 5 corresponds to the other example. Even in this state, sound (noise) can be reduced by the enveloping layer 18.

In addition, as another example, the bearing 10 may be applied to a wheelchair in which a traveling direction is turned. As the bearing 10 is applied to the wheelchair, the bearing 10 can be turned to correspond to the traveling direction of the moving body 1.

Further, as an example of another use, the bearing 10 may be used in a conveyance apparatus (a drive module) for a bill, a ticket, or the like. In this case, in the conveyance apparatus, the inner rings 22 of a pair of bearings 10 are installed at a pair of adjacent support shafts 3. The outer ring 21 having the enveloping layer 18 is rotatably supported by the support shaft. The pair of enveloping layers 18 are disposed adjacent to each other or in contact with each other. In this state, as the outer ring 21 and the enveloping layer 18 are rotated, a bill, a ticket, or the like is sandwiched and conveyed between the pair of enveloping layers 18.

Since the enveloping layer 18 is formed on the outer ring 21, when a bill, a ticket, or the like is conveyed while sandwiched between the enveloping layers 18 of the pair of bearings 10, sound (noise) can be reduced by the enveloping layers 18. In addition, since the enveloping layer 18 is strongly engaged with the outer circumferential surface 24 of the outer ring 21, the separation of the enveloping layer 18 from the outer circumferential surface 24 of the outer ring 21 can be prevented.

In this way, as the bearings 10 are provided in the conveyance apparatus, the conveyance apparatus can be obtained at a low cost while durability can be secured.

Next, bearings of a second embodiment to a sixth embodiment and structures with thermoplastic elastomer enveloping layers of a seventh embodiment and an eighth embodiment will be described with reference to FIG. 5 to FIG. 11. Further, in the bearings of the second embodiment to the sixth embodiment, the same members as and similar members to the bearing 10 of the first embodiment may be designated by the same reference numerals, and detailed description thereof will be omitted.

Second Embodiment

Figure 5:
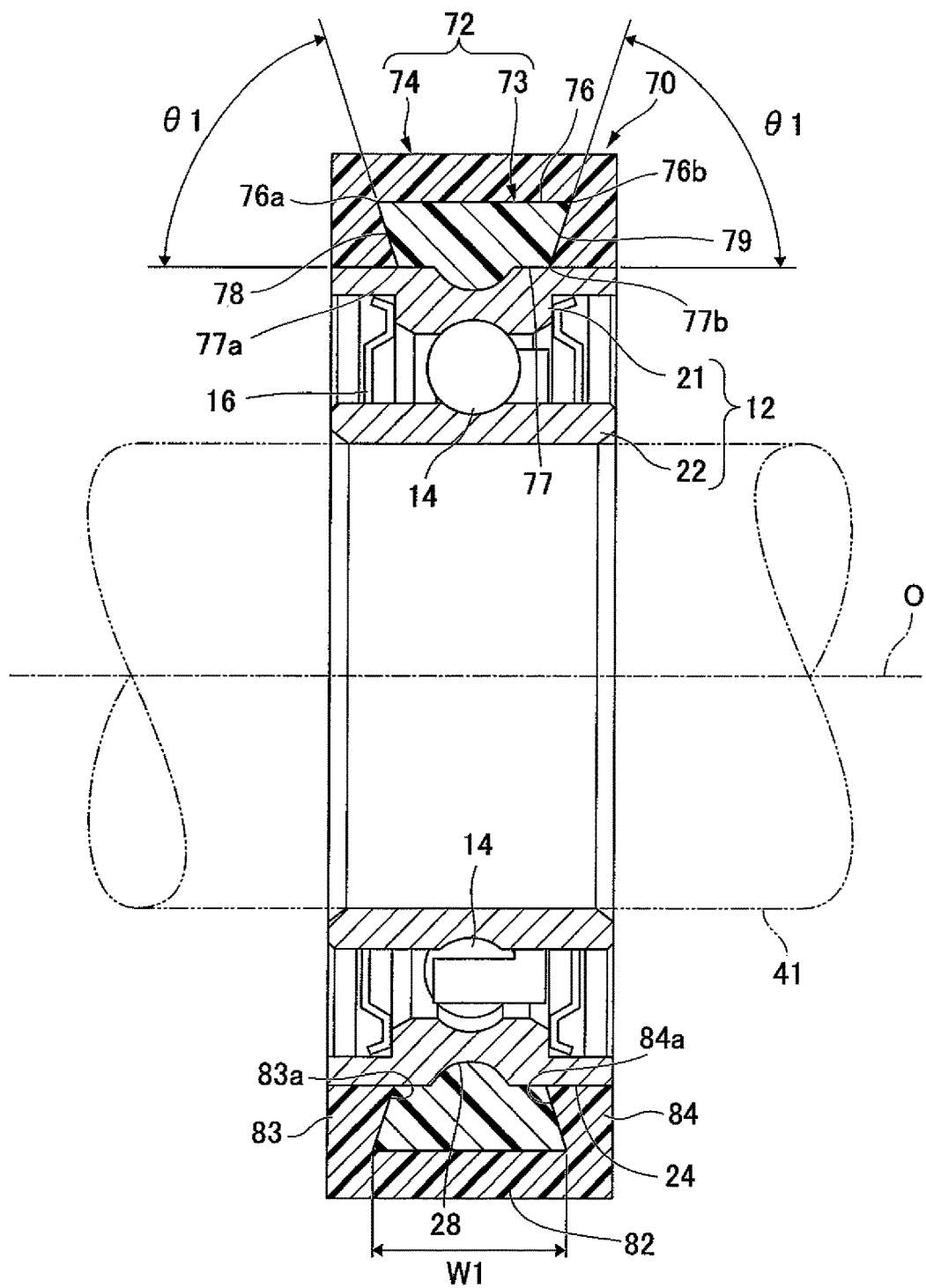
FIG. 5 is a schematic cross-sectional view showing a preferred example of a bearing as a structure with a thermoplastic elastomer enveloping layer according to a second embodiment of the first aspect of the present invention.

FIG. 5 is a schematic cross-sectional view of a bearing 70 according to the second embodiment.

As shown in FIG. 5, the bearing 70 is obtained by replacing the enveloping layer 18 of the first embodiment with an enveloping layer 72, and other constitutions are the same as those of the bearing 10 of the first embodiment. In the enveloping layer 72, the first material layer 43 and the second material layer 44 of the first embodiment are replaced with the first material layer 73 and the second material layer 74.

The first material layer 73 has a first outer circumferential surface 76, a first inner circumferential surface 77, a first side surface 78 and a second side surface 79. The first outer circumferential surface 76 is formed to be the same as the first outer circumferential surface 46 of the first material layer 43 of the first embodiment. The first inner circumferential surface 77 is formed to be the same as the first inner circumferential surface 47 of the first material layer 43 of the first embodiment. The first inner circumferential surface 77 is formed to have a length dimension smaller than a length dimension of the first outer circumferential surface 76.

The first side surface 78 extends from one end 77a of the first inner circumferential surface 77 to one end 76a of the first outer circumferential surface 76 to be inclined outward from a center of the outer ring 21 in the axis O direction at an inclination angle θ1. The second side surface 79 extends from the other end 77b of the first inner circumferential surface 77 to the other end 76b of the first outer circumferential surface 76 to be inclined outward from the center of the outer ring 21 in the axis O direction at the inclination angle θ1.

The inclination angle θ1 of the first side surface 78 and the second side surface 79 is set to be less than 90 degrees. That is, the first material layer 73 is formed so that a width dimension W1 gradually increases outward from the outer circumferential surface 24 of the outer ring 21 in the radial direction.

The second material layer 74 forms an outer circumferential surface layer of the enveloping layer 72. The second material layer 74 has an outer circumferential surface layer 82, a first side surface layer 83 and a second side surface layer 84. The outer circumferential surface layer 82 is formed to be the same as the outer circumferential surface layer 52 of the second material layer 44 of the first embodiment. The first side surface layer 83 has a first inner surface 83a formed in an inclined shape to be in contact with the first side surface 78. The second side surface layer 84 has a second inner surface 84a formed in an inclined shape to be in contact with the first side surface 78.

Therefore, the first side surface layer 83 (particularly, the first inner surface 83a) can be suitably embedded in the first side surface 78 when the second material layer 74 contracts by cooling. Further, the second side surface layer 84 (particularly, the second inner surface 84a) can be suitably embedded in the second side surface 79.

According to the bearing 70 of the second embodiment, the second material layer 74 is more firmly fixed to the first material layer 73. As a result, it is possible to more reliably prevent the second material layer 74 from being separated from the first material layer 73 (that is, the outer circumferential surface 24 of the outer ring 21).

Further, according to the bearing 70 of the second embodiment, like the bearing 10 of the first embodiment, the bearing 70 in which the enveloping layer 72 is formed on the outer circumferential surface 24 of the outer ring 21 can be manufactured in large quantities and at a low cost.

Third Embodiment

Figure 6:
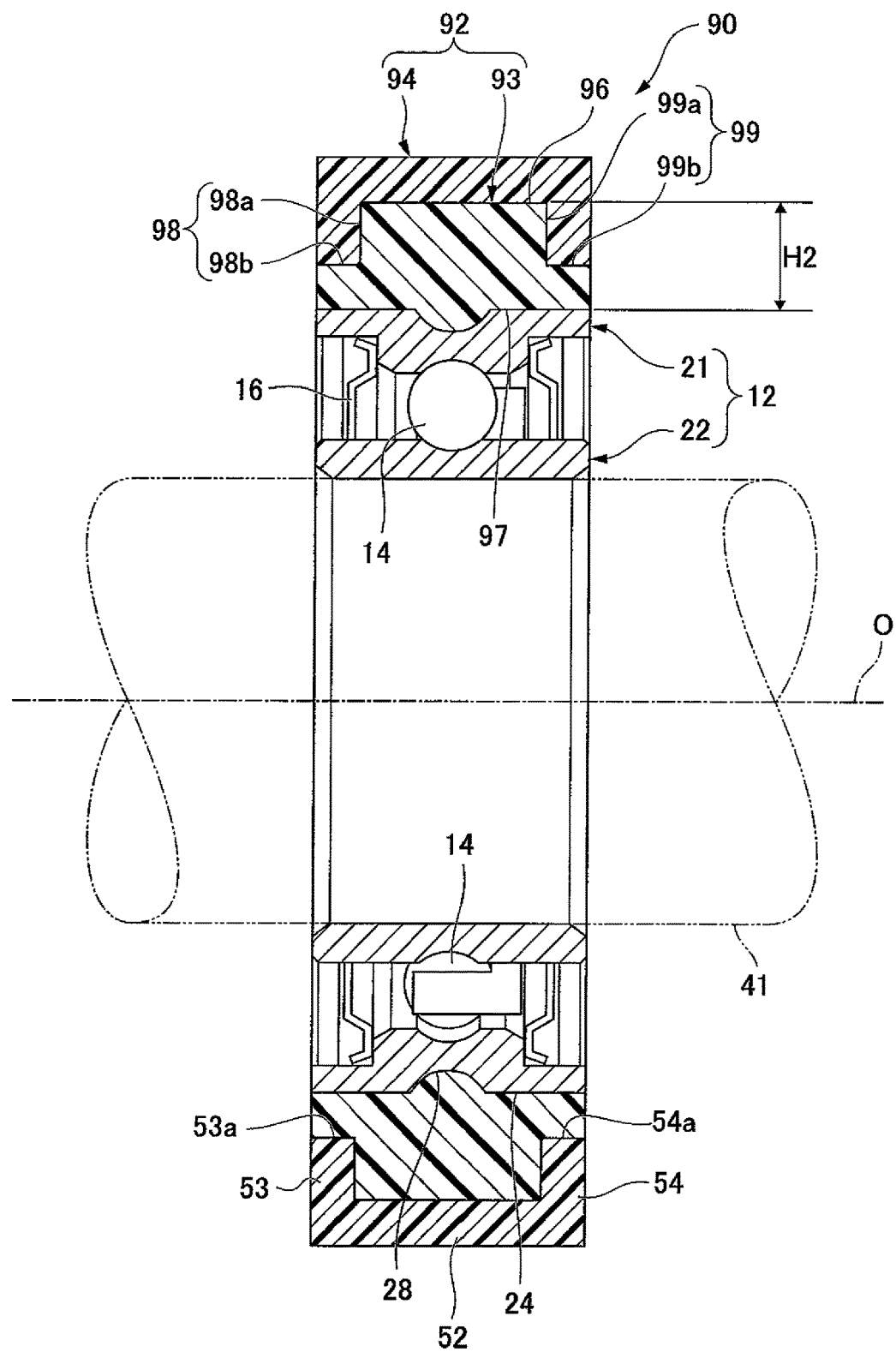
FIG. 6 is a schematic cross-sectional view showing a preferred example of a bearing as a structure with a thermoplastic elastomer enveloping layer according to a third embodiment of the first aspect of the present invention.

FIG. 6 is a schematic cross-sectional view of a bearing 90 according to a third embodiment.

As shown in FIG. 6, the bearing 90 is obtained by replacing the enveloping layer 18 of the first embodiment with an enveloping layer 92, and other constitutions are the same as those of the bearing 10 of the first embodiment. The enveloping layer 92 is a constitution in which the first material layer 43 and the second material layer 44 of the first embodiment are replaced with a first material layer 93 and a second material layer 94.

The first material layer 93 has a first outer circumferential surface 96, a first inner circumferential surface 97, a first concave surface 98 and a second concave surface 99. The first outer circumferential surface 96 is formed to be the same as the first outer circumferential surface 46 of the first material layer 43 of the first embodiment. The first inner circumferential surface 97 is the same as the first inner circumferential surface 47 of the first material layer 43 of the first embodiment except for the following points, and the first inner circumferential surface 97 is formed to have the same width as that of the outer circumferential surface 24 of the outer ring 21. A large contact area of the first inner circumferential surface 97 with the outer circumferential surface 24 of the outer ring 21 is secured. Therefore, the first material layer 93 is firmly fixed to the outer circumferential surface 24 of the outer ring 21 by cooling and contracting after injection molding.

The first concave surface 98 includes a first side surface 98a and a first circumferential surface 98b and is formed to provide an one stage lower portion, in other words, is formed in a surface of a step-like recessed portion of the first material layer 93.

The second concave surface 99 includes a second side surface 99a and a second circumferential surface 99b and is formed to provide an one stage lower portion.

In the first material layer 93, a height dimension from the first inner circumferential surface 97 to the first outer circumferential surface 96 is H2. The height dimension H2 of the first material layer 93 is preferably set larger than that of the first material layer 43 of the first embodiment.

The second material layer 94 is formed to be the same as the second material layer 44 of the first embodiment. That is, the second material layer 94 forms an outer circumferential surface layer of the enveloping layer 92. Like the second material layer 44 of the first embodiment, the second material layer 94 has the outer circumferential surface layer 52, the first side surface layer 53 and the second side surface layer 54. As the second material layer 94 cools and contracts, the entire region of the first side surface 98a and the second side surface 99a can be sandwiched between the first side surface layer 53 and the second side surface layer 54. Further, the inner circumferential surface 53a of the first side surface layer 53 is thermally bonded to the first circumferential surface 98b. The inner circumferential surface 54a of the second side surface layer 54 is thermally bonded to the second circumferential surface 99b.

Due to such a constitution, the second material layer 94 can be firmly engaged with the first material layer 93.

In this way, the first material layer 93 is firmly fixed to the outer circumferential surface 24 of the outer ring 21 by cooling and contracting after injection molding. Also, the second material layer 94 is firmly engaged with the first material layer 93. In particular, the inner circumferential surface 53a of the first side surface layer 53 of the second material layer is thermally bonded to the first circumferential surface 98b, and the inner circumferential surface 54a of the second side surface layer 54 of the second material layer is thermally bonded to the second circumferential surface 99b. Therefore, the second material layer 94 is more firmly engaged with the first material layer 93. Thus, the second material layer 94 can be made unlikely to separate from the first material layer 93.

According to the bearing 90 of the third embodiment, the second material layer 94 can be firmly engaged with the outer circumferential surface 24 of the outer ring 21 via the first material layer 93. Due to such a constitution, it is possible to prevent the enveloping layer 92 from being separated from the outer circumferential surface 24 (that is, the outer ring 21).

Further, according to the bearing 90 of the third embodiment, like the bearing 10 of the first embodiment, the bearing 90 in which the enveloping layer 92 is formed on the outer circumferential surface 24 of the outer ring 21 can be manufactured in large quantities and at a low cost.

Fourth Embodiment

Figure 7:
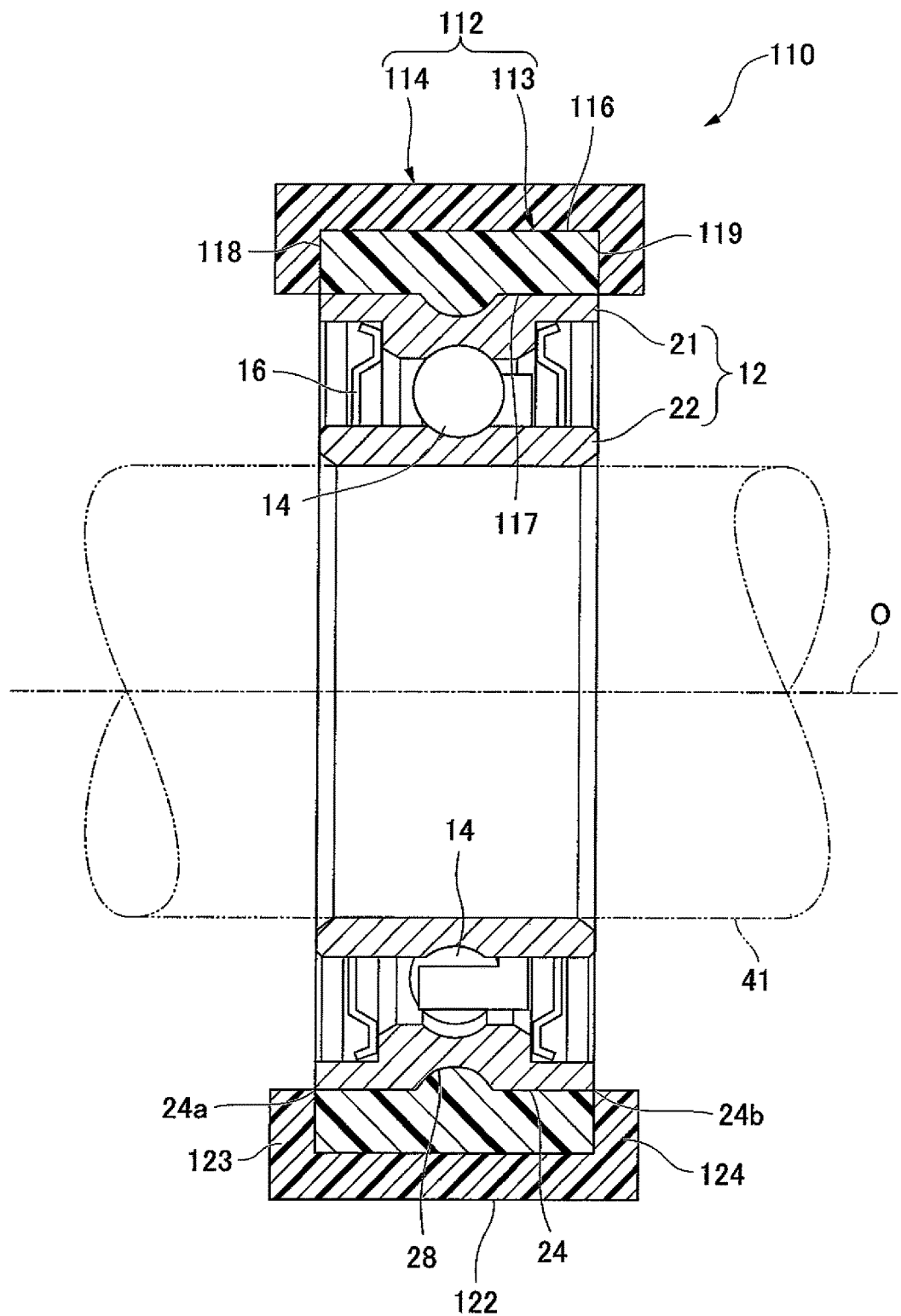
FIG. 7 is a schematic cross-sectional view showing a preferred example of a bearing as a structure with a thermoplastic elastomer enveloping layer according to a fourth embodiment of the first aspect of the present invention.

FIG. 7 is a schematic cross-sectional view of a bearing 110 according to a fourth embodiment.

As shown in FIG. 7, the bearing 110 is obtained by replacing the enveloping layer 18 of the first embodiment with an enveloping layer 112, and other constitutions are the same as those of the bearing 10 of the first embodiment. The enveloping layer 112 is a constitution in which the first material layer 43 and the second material layer 44 of the first embodiment are replaced with a first material layer 113 and a second material layer 114.

The first material layer 113 has a first outer circumferential surface 116, a first inner circumferential surface 117, a first side surface 118 and a second side surface 119. The first outer circumferential surface 116 is formed to be the same as the first outer circumferential surface 46 of the first material layer 43 except for the following points, and the first outer circumferential surface 116 is formed to have the same width as that of the outer circumferential surface 24 of the outer ring 21. The first inner circumferential surface 117 is formed to be the same as the first inner circumferential surface 47 of the first material layer 43 except for the following points, and the first inner circumferential surface 117 is formed to have the same width as that of the outer circumferential surface 24 of the outer ring 21. A large contact area of the first inner circumferential surface 117 with the outer circumferential surface 24 of the outer ring 21 is secured. Therefore, the first material layer 113 is firmly fixed to the outer circumferential surface 24 of the outer ring 21 by cooling and contracting after injection molding.

The second material layer 114 forms an outer circumferential surface layer of the enveloping layer 112. Like the second material layer 44 of the first embodiment, the second material layer 114 has an outer circumferential surface layer 122, a first side surface layer 123 and a second side surface layer 124. The outer circumferential surface layer 122 is formed to be substantially the same as the outer circumferential surface layer 52 of the first embodiment except for the following points, and the outer circumferential surface layer 122 is formed to protrude outward in the axis O direction from both end edges (that is, the first end edge 24a, the second end edge 24b) of the outer circumferential surface 24 of the outer ring 21.

The first side surface layer 123 is in contact with the first side surface 118 of the first material layer 113. The second side surface layer 124 is in contact with the second side surface 119 of the first material layer 113.

As the second material layer 114 cools and contracts, the entire region of the first side surface 118 and the second side surface 119 can be sandwiched between the first side surface layer 123 and the second side surface layer 124. Accordingly, the second material layer 114 can be firmly engaged with the first material layer 113.

In the way, the first material layer 113 is firmly fixed to the outer circumferential surface 24 of the outer ring 21 by cooling and contracting after injection molding. Also, the second material layer 114 is firmly engaged with the first material layer 113.

According to the bearing 110 of the fourth embodiment, the second material layer 114 can be firmly engaged with the outer circumferential surface 24 of the outer ring 21 via the first material layer 113. Due to such a constitution, it is possible to prevent the enveloping layer 112 from being separated from the outer circumferential surface 24 (that is, the outer ring 21).

Further, according to the bearing 110 of the fourth embodiment, like the bearing 10 of the first embodiment, the bearing 110 in which the enveloping layer 112 is formed on the outer circumferential surface 24 of the outer ring 21 can be manufactured in large quantities and at a low cost.

Fifth Embodiment

Figure 8:
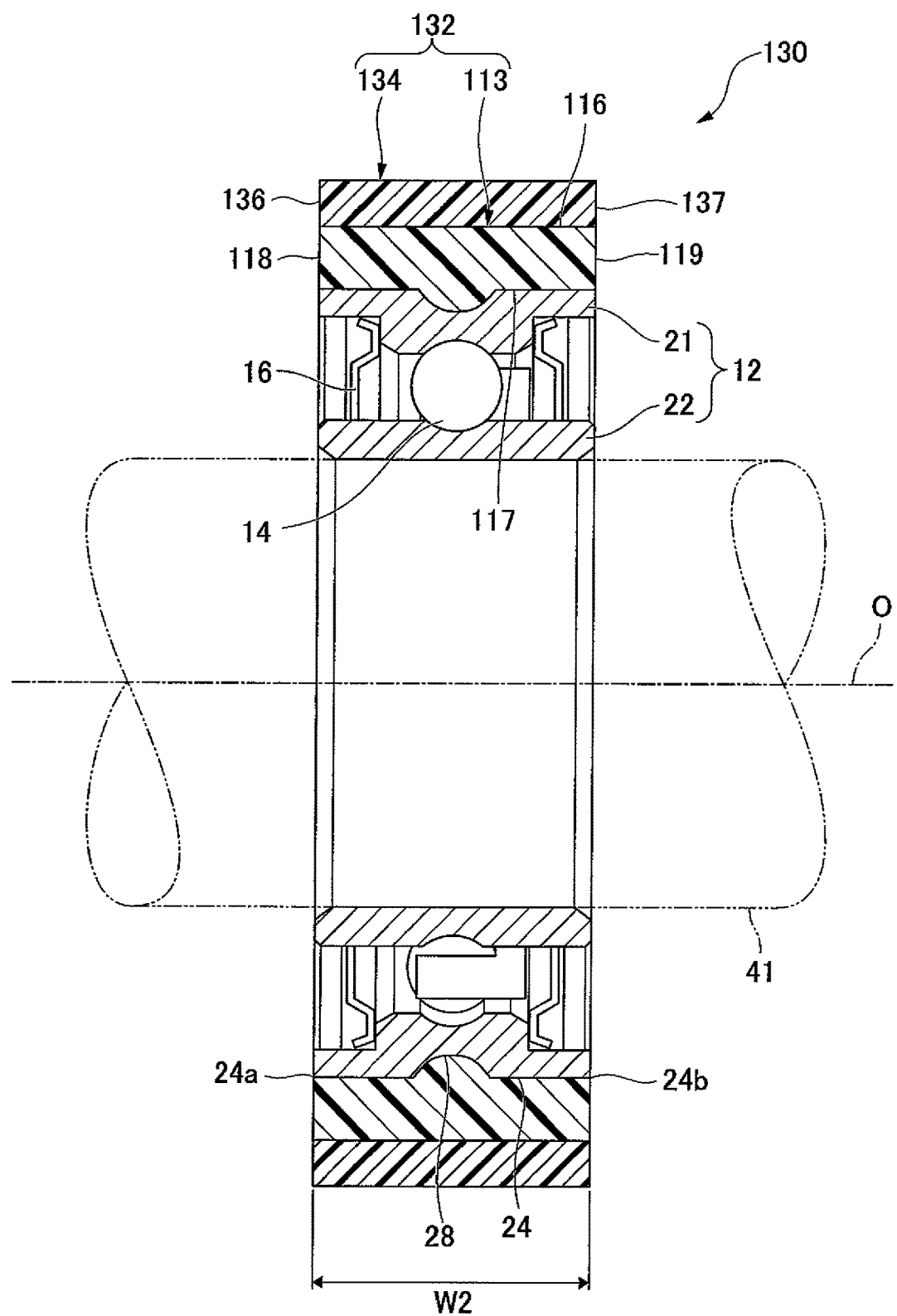
FIG. 8 is a schematic cross-sectional view showing a preferred example of a bearing as a structure with a thermoplastic elastomer enveloping layer according to a fifth embodiment of the first aspect of the present invention.

FIG. 8 is a schematic cross-sectional view of a bearing 130 according to a fifth embodiment.

As shown in FIG. 8, the bearing 130 is obtained by replacing the enveloping layer 112 of the fourth embodiment with an enveloping layer 132, and other constitutions are the same as those of the bearing 110 of the fourth embodiment. The enveloping layer 132 is formed by replacing the second material layer 114 of the fourth embodiment with a second material layer 134 and further includes the first material layer 113 which is the same as that of the fourth embodiment.

Like the fourth embodiment, the first material layer 113 is firmly fixed to the outer circumferential surface 24 of the outer ring 21 by cooling and contracting after injection molding.

The second material layer 134 forms an outer circumferential surface layer of the enveloping layer 132. The second material layer 134 is formed to be smaller than a length dimension of the outer circumferential surface layer 122 of the fourth embodiment. The second material layer 134 has a first side surface 136 and a second side surface 137.

The first side surface 136 is flush with the first end edge 24a of the outer circumferential surface 24 of the outer ring 21. The second side surface 137 is flush with the second end edge 24b of the outer circumferential surface 24 of the outer ring 21. That is, the second material layer 134 is formed to have the same width dimension W2 as that of the outer circumferential surface 24 of the outer ring 21 and the first material layer 113.

The second material layer 134 is firmly engaged with the first outer circumferential surface 116 of the first material layer 113 by thermal bonding.

In this way, the first material layer 113 is firmly fixed to the outer circumferential surface 24 of the outer ring 21 by cooling and contracting after injection molding. Also, the second material layer 134 is firmly engaged with the first material layer 113.

Due to such a constitution, according to the bearing 130 of the fifth embodiment, the second material layer 134 can be firmly engaged with the outer circumferential surface 24 of the outer ring 21 via the first material layer 113.

Sixth Embodiment

Figure 9:
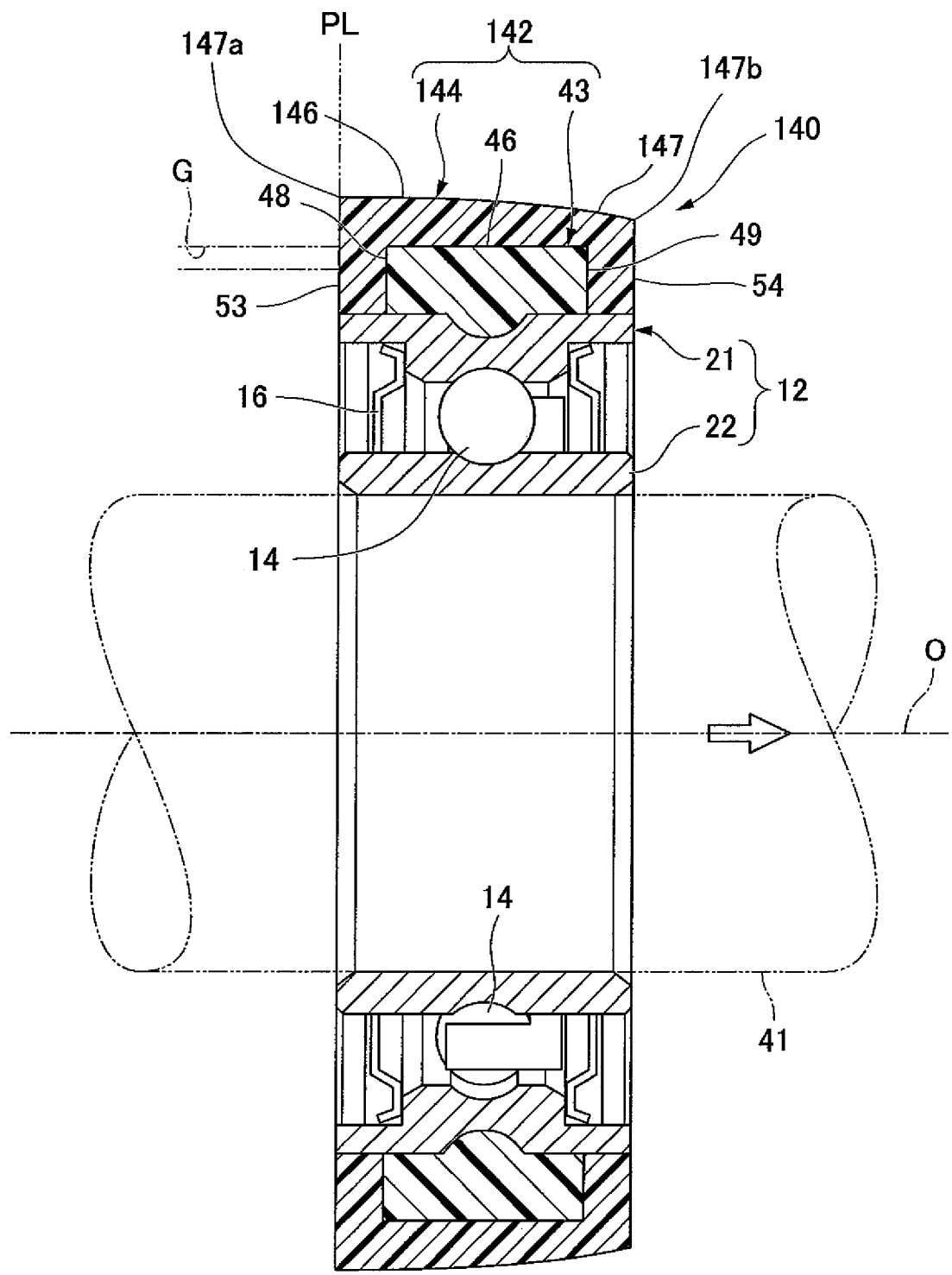
FIG. 9 is a schematic cross-sectional view showing a preferred example of a bearing as a structure with a thermoplastic elastomer enveloping layer according to a sixth embodiment of the first aspect of the present invention.

FIG. 9 is a schematic cross-sectional view of a bearing 140 according to a sixth embodiment.

As shown in FIG. 9, the bearing 140 is obtained by replacing the enveloping layer 18 of the first embodiment with an enveloping layer 142, and other constitutions are the same as those of the bearing 10 of the first embodiment. The enveloping layer 142 is formed by replacing the second material layer 44 of the first embodiment with a second material layer 144 and further includes the first material layer 43 which is the same as that of the first embodiment.

The second material layer 144 forms an outer circumferential surface layer of the enveloping layer 142. The second material layer 144 has an outer circumferential surface layer 146, the first side surface layer 53 and the second side surface layer 54. The outer circumferential surface layer 146 is obtained by replacing the outer circumferential surface of the outer circumferential surface layer 52 of the first embodiment with a curved coated outer circumferential surface 147, and the other portions are the same as those of the outer circumferential surface layer 52 of the first embodiment.

The coated outer circumferential surface 147 has a first end portion 147a and a second end portion 147b. The coated outer circumferential surface 147 is formed in a curved shape so that an outer diameter thereof gradually decreases from the first end portion 147*a* to the second end portion 147*b*. The coated outer circumferential surface 147 may be linearly formed so that the outer diameter gradually decreases.

A parting line PL of the mold at the time of manufacturing is located at the first end portion 147*a*. That is, the coated outer circumferential surface 147 is formed in a curved shape so that the outer diameter gradually decreases from the parting line PL to the second end portion 147*b*. Therefore, after the enveloping layer 142 (the first material layer 43 and the second material layer 144) is insert-molded, occurrence of burrs on the coated outer circumferential surface 147 can be suppressed by opening a movable die of the mold in an arrow direction.

Accordingly, after the enveloping layer 142 (the first material layer 43 and the second material layer 144) is insert-molded on the outer circumferential surface 24 of the outer ring 21, post-processing of removing the burrs from the coated outer circumferential surface 147 can be unnecessary.

According to the bearing 140 of the sixth embodiment, the outer diameter of the coated outer circumferential surface 147 is gradually reduced. Therefore, when a bill, a ticket, or the like is conveyed by the coated outer circumferential surface 147 or when the coated outer circumferential surface 147 moves while rolling on the contact object, a contact area with the bill, the ticket, the contact object, or the like can be minimized to a small level. Due to such a constitution, when the bill, the ticket, or the like is conveyed by the coated outer circumferential surface 147 or when the coated outer circumferential surface 147 moves while rolling on the contact object, an effect of decreasing sound (noise) is obtained.

Further, according to the bearing 140 of the sixth embodiment, the second material layer 144 can be firmly engaged with the outer circumferential surface 24 of the outer ring 21 via the first material layer 43. As a result, it is possible to prevent the enveloping layer 142 from being separated from the outer circumferential surface 24 (that is, the outer ring 21).

Also, according to the bearing 140 of the sixth embodiment, like the bearing 10 of the first embodiment, the bearing 140 in which the enveloping layer 142 is formed on the outer circumferential surface 24 of the outer ring 21 can be manufactured in large quantities and at a low cost.

In the first embodiment to the sixth embodiment, the examples in which the enveloping layers 18, 72, 92, 112, 132 and 142 are formed on the bearings 10, 70, 90, 110, 130 and 140 as the structures with the thermoplastic elastomer enveloping layers have been described. However, the present invention is not limited thereto. Like the seventh embodiment and the eighth embodiment, enveloping layers 154 and 164 may be formed on a cylindrical member 152 or a flat member 162.

Seventh Embodiment

Figure 10:
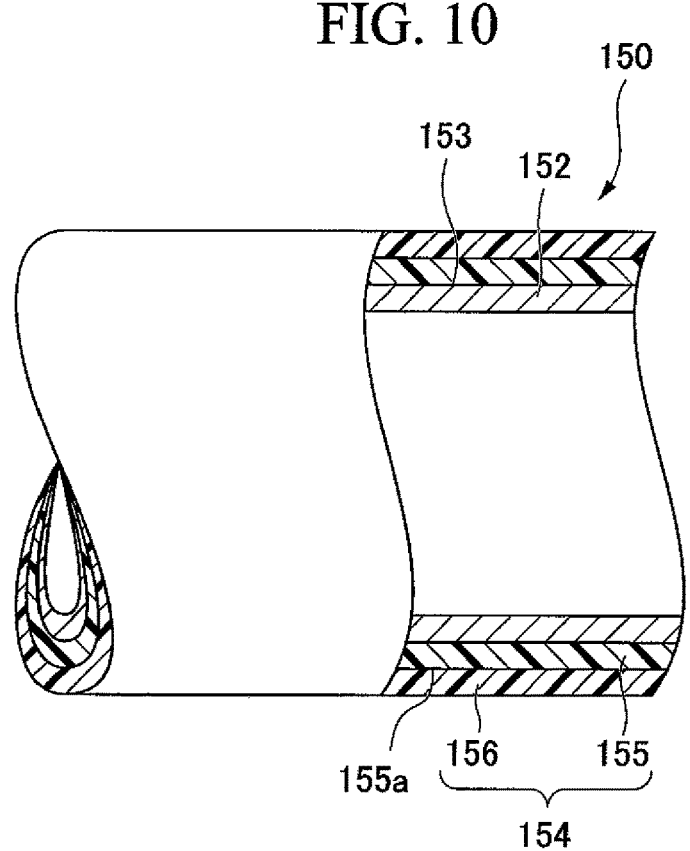
FIG. 10 is a schematic cross-sectional view showing a preferred example of a structure with a thermoplastic elastomer enveloping layer according to a seventh embodiment of the first aspect of the present invention.

FIG. 10 is a cross-sectional view of a structure 150 with a thermoplastic elastomer enveloping layer according to a seventh embodiment.

As shown in FIG. 10, in the structure 150 with the thermoplastic elastomer enveloping layer, the enveloping layer 154 is formed on an outer circumferential surface (that is, a circular outer surface) 153 of the cylindrical member 152. The cylindrical member 152 is formed of an arbitrarily selected material, for example, a metal material such as stainless steel.

The enveloping layer 154 includes a first material layer 155 formed on the outer circumferential surface 153 and a second material layer 156 formed on a first outer circumferential surface 155*a* of the first material layer 155.

Like the first material layer 43 (refer to FIG. 1) of the first embodiment, the first material layer 155 is formed of the same amorphous plastic. The second material layer 156 forms an outer circumferential surface layer of the enveloping layer 154. The second material layer 156 is formed of the same thermoplastic elastomer as the second material layer 44 (refer to FIG. 1) of the first embodiment.

According to the structure 150 with the thermoplastic elastomer enveloping layer of the seventh embodiment, like the bearing 10 of the first embodiment, the first material layer 155 and the second material layer 156 can be strongly coupled or engaged with the outer circumferential surface 153 of the cylindrical member 152. Therefore, it is possible to prevent the enveloping layer 154 from being separated from the outer circumferential surface 153 of the cylindrical member 152.

Further, according to the structure 150 with the thermoplastic elastomer enveloping layer of the seventh embodiment, like the bearing 10 of the first embodiment, the structure 150 with the thermoplastic elastomer enveloping layer, in which the enveloping layer 154 is formed on the outer circumferential surface 153 of the cylindrical member 152, can be manufactured in large quantities at a low cost.

Like the bearing 10 of the first embodiment, the cylindrical member 152 may have a groove portion formed in the outer circumferential surface 153. The groove portion may be annularly formed in the circumferential direction of the outer circumferential surface 153. A plurality of groove portions may be formed at intervals in the axial direction of the outer circumferential surface 153.

In the seventh embodiment, the example in which the first material layer 155 and the second material layer 156 are formed as the enveloping layer 154 in the cylindrical member 152 has been described. However, the present invention is not limited thereto. As another example, the first material layer 155 and the second material layer 156 may be formed as the enveloping layer 154 on a columnar member.

Eighth Embodiment

Figure 11:
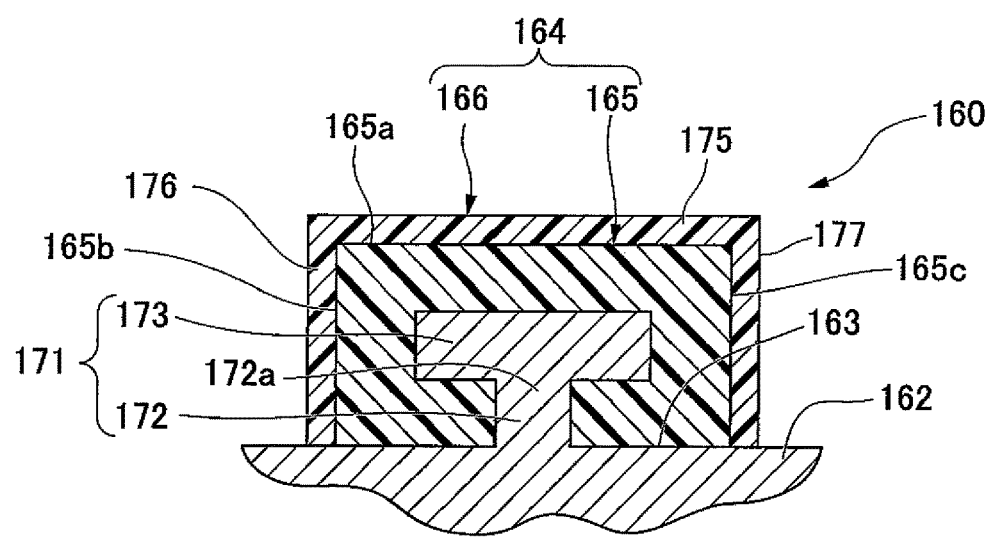
FIG. 11 is a schematic cross-sectional view showing a preferred example of a structure with a thermoplastic elastomer enveloping layer according to an eighth embodiment of the first aspect of the present invention.

FIG. 11 is a cross-sectional view of a structure 160 with a thermoplastic elastomer enveloping layer according to an eighth embodiment.

As shown in FIG. 11, in the structure 160 with the thermoplastic elastomer enveloping layer, an enveloping layer 164 is formed on an outer surface 163 of the flat member 162. The flat member 162 is formed of an arbitrarily selected material, for example, a metal material such as stainless steel.

The enveloping layer 164 includes a first material layer 165 formed on the outer surface 163 and a second material layer 166 formed on the outer surface of the first material layer 165.

The flat member 162 may have, for example, a protrusion 171 on the outer surface 163. The protrusion 171 has a leg portion 172 protruding in a direction intersecting the outer surface 163 and an extension portion 173 formed at a distal end 172*a* of the leg portion 172. The protrusion 171 is formed in a T shape as seen from a cross section by the leg portion 172 and the extension portion 173. That is, the outer surface 163 of the flat member 162 is a flat outer surface with irregularities, in other words, a flat outer surface with a protrusion. A shape of the protrusion 171 may be a shape arbitrarily selected.

The protrusion 171 is covered with the first material layer 165 formed on the outer surface 163 of the flat member 162. The first material layer 165 is formed of the same amorphous plastic as the first material layer 43 (refer to FIG. 1) of the first embodiment. The first material layer 165 is firmly engaged with the outer surface 163 of the flat member 162 by being engaged with the protrusion 171.

A second material layer 166 is formed on an outer surface 165*a* of the first material layer 165. The second material layer 166 forms an outer circumferential surface layer of the enveloping layer 164. The second material layer 166 is formed of the same thermoplastic elastomer as the second material layer 44 (refer to FIG. 1) of the first embodiment.

The second material layer 166 has an outer circumferential surface layer 175, a first side surface layer 176 and a second side surface layer 177. Both side surfaces (a first side surface 165*b* and a second side surface 165*c*) of the first material layer 165 are sandwiched between the first side surface layer 176 and the second side surface layer 177 of the second material layer 166. Therefore, as the second material layer 166 cools and contracts, the first side surface 165*b* and the second side surface 165*c* of the first material layer 165 can be sandwiched by the second material layer 166 (the first side surface layer 176 and the second side surface layer 177). Accordingly, the second material layer 166 can be firmly engaged with the first material layer 165.

According to the structure 160 with the thermoplastic elastomer enveloping layer of the eighth embodiment, like the bearing 10 of the first embodiment, the first material layer 165 and the second material layer 166 can be firmly engaged with the outer surface 163 of the flat member 162. Accordingly, it is possible to prevent the enveloping layer 164 from being separated from the outer surface 163 of the flat member 162.

Further, according to the structure 160 with the thermoplastic elastomer enveloping layer of the eighth embodiment, like the bearing 10 of the first embodiment, the structure 160 with the thermoplastic elastomer enveloping layer, in which the enveloping layer 164 is formed on the outer surface 163 of the flat member 162, can be manufactured in large quantities at a low cost. It is not limited to this structure and may have the first material layer 165 and the second material layer 166 having shapes as shown in the second to sixth embodiments.

Here, modified examples of the first embodiment to the sixth embodiment will now be described. That is, the example in which the outer rings 21 of the bearings 10, 70, 90, 110, 130 and 140 are formed of a metal material has been described in the first embodiment to the sixth embodiment. However, the present invention is not limited thereto. As the bearings of the modified examples of the first embodiment to the sixth embodiment, for example, the outer rings 21 of the bearings 10, 70, 90, 110, 130 and 140 are formed of a hard plastic (amorphous plastic) or the like.

As the outer rings 21 are formed of the amorphous plastic, the second material layers (outer circumferential surface layers) 44, 74, 94, 114, 134, 144, 156 and 166 can be firmly and directly formed on the outer rings 21 formed of an amorphous plastic. Due to such a constitution, the first material layers 43, 73, 93, 113, 155 and 165 can be removed, and the constitution can be simplified.

Further, the outer ring 21 and the first material layers 43, 73, 93, 113, 155 and 165 may be integrally formed of a hard plastic (amorphous plastic). Due to such a constitution, effects which are the same as those of the first embodiment to the sixth embodiment can be obtained.

Further, modified examples of the seventh embodiment to the eighth embodiment will be described. That is, the example in which the cylindrical member 152 and the flat member 162 are formed of a metallic material has been described in the seventh embodiment to the eighth embodiment. However, the present invention is not limited thereto. As the modified examples of the seventh embodiment to the eighth embodiment, for example, the cylindrical member 152 or the flat member 162 may be formed of a hard plastic (amorphous plastic).

Since the cylindrical member 152 or the flat member 162 is formed of the amorphous plastic, the second material layer 156 or 166 can be directly formed on the cylindrical member 152 or the flat member 162 formed of the amorphous plastic. Therefore, the first material layer 155 or 165 can be removed, and the constitution can be simplified.

Further, the cylindrical member 152 or the flat member 162 and the first material layers 155 and 165 may be integrally formed of the hard plastic (amorphous plastic). Therefore, effects which are the same as those of the seventh embodiment and the eighth embodiment can be obtained.

Modified Example

Figure 12:
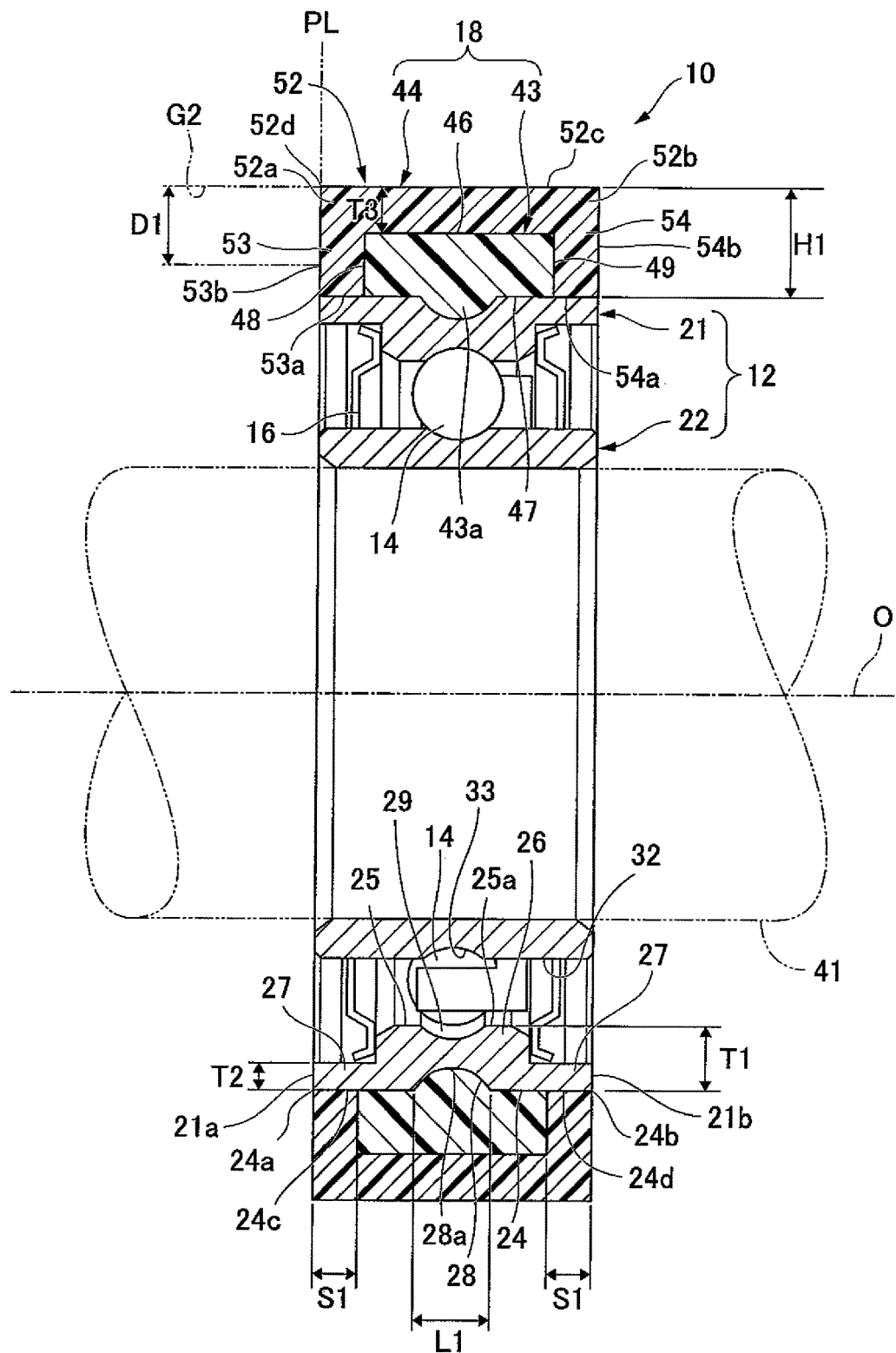
FIG. 12 is a schematic cross-sectional view showing a modified example according to the first embodiment of the first aspect of the present invention.

FIG. 12 is a cross-sectional view of a bearing according to a modified example of the first embodiment of the first aspect of the present invention.

As shown in FIG. 12, it is also possible to mold the second material layer 44 of the bearing 10 using a thermoplastic elastomer filled from a gate G2 having a large gate diameter D1 of the mold.

In the gate G2, the gate diameter D1 is formed larger than a thickness dimension T3 of the second material layer 44. Further, the gate G2 of the mold is arranged to axially overlap both a position of the first material layer 43 and an intended position of the second material layer 44, that is, at least a part of each layer when seen in the axial direction.

As the inside (cavity) of the mold is filled with the thermoplastic elastomer from the gate G2, the second material layer 44 is insert-molded with respect to the first material layer 43 and the first side portion 24*c* and the second side portion 24*d* of the outer circumferential surface 24 of the outer ring.

The gate diameter D1 of the gate G2 of the mold is formed large, and the gate G 2 is disposed to overlap both the first material layer 43 and the second material layer 44. Therefore, the second material layer 44 can be satisfactorily formed even when a thickness dimension T3 of the second material layer 44 is small:

Further, the thermoplastic elastomer can be filled on the outer surface 53*b* of the first material layer 43 (specifically, the first side surface layer 53 of the second material layer) with a large pressure. Accordingly, adhesion between both layers of the first material layer 43 and the second material layer 44 can be increased.

The example in which the second material layer 44 of the bearing 10 is molded using a mold having the gate G2 with the large gate diameter D1 has been described in the modified example. However, the present invention is not limited thereto. As another example, for example, the second material layers 74, 94, 114 and 144 of the bearings 70, 90, 110 and 140 may be molded with the gate G2 having the large gate diameter D1.

Further, the technical scope of this aspect is not limited to the above-described embodiments, and various modified examples can be made without departing from the gist of the present invention.

The use for rotating and sliding the enveloping layers 18, 72, 92, 112, 132, 142, 154 and 164 of the bearings 10, 70, 90, 110, 130 and 140 has been described in the first embodiment to the seventh embodiment, but the present invention is not limited thereto. As another example, it may be applied to a member for fixing the other member to the bearing 10, 70, 90, 110, 130 or 140 (a replacement for an O-ring) or an insulating member for preventing electric erosion.

Further, the examples in which the enveloping layers 18, 72, 92, 112, 132, 142, 154 and 164 are formed on the outer circumferential surfaces 24 of the outer rings 21 have been exemplarily described in the first embodiment to the seventh embodiment, but the present invention is not limited thereto. As another example, the enveloping layer may be formed on the inner circumferential surface (inner outer surface) of the inner ring 22.

Furthermore, the examples in which the first material layer and the second material layer are formed on the outer ring 21 of the bearings 10, 70, 90, 110, 130 and 140 have been described in the first embodiment to sixth embodiment. However, the present invention is not limited thereto. As another example, for example, the first material layer, the second material layer and a third material layer may be sequentially formed on the outer ring 21. In addition, the second material layer is formed of a material softer than the first material layer. Also, the third material layer is formed of a material harder than the second material layer.

Accordingly, it is possible to reduce noise (noise) when the bearing is driven, and it is also possible to realize a bearing excellent in wear resistance and durability of the bearing.

Further, the examples in which the width dimensions of the enveloping layers 18, 72, 92, 112, 132 and 142 are set to be the same as a width dimension of the ring body 12 have been exemplarily described in the first embodiment to the seventh embodiment. However, the present invention is not limited thereto. As another example, for example, the width dimensions of the enveloping layers 18, 72, 92, 112, 132 and 142 may be set to be smaller than that of the ring body 12. Hereinafter, the enveloping layers 18, 72, 92, 112, 132 and 142 are abbreviated as "the enveloping layers 18 and so on."

Since the width dimensions of the enveloping layers 18 and so on are decreased, reduction of sound (noise) can be achieved by decreasing a use amount of a material which forms the enveloping layers 18 and so on and reducing contact areas of the second material layers (that is, the outer circumferential surface layers) of the enveloping layers 18 and so on.

Further, in the first embodiment to the seventh embodiment, the groove portions or wrinkle portions may be formed in the first outer circumferential surfaces 46, 76, 96, 116, 155*a* and 165*a* of the first material layers 43, 73, 93, 113, 155 and 165. The shape and the number of groove portions can be arbitrarily selected and may be formed, for example, to extend in the axial direction of the bearing. It is possible to increase the bonding strength of the second material layer to the first outer circumferential surface of the first material layer by forming the groove portions or wrinkle portions in the first outer circumferential surfaces 46, 76, 96, 116, 155*a* and 165*a*.

(Bearing of Second Aspect)

A bearing according to a second aspect of the present invention includes an enveloping layer formed on an outer circumferential surface of an outer ring. The enveloping layer includes a first material layer formed on the outer circumferential surface of the outer ring, and a second material layer configured to serve as an outer circumferential surface layer forming an outer circumferential surface of the enveloping layer by thermally fusing a thermoplastic elastomer to an outer surface of the first material layer. The second material layer is a material softer than the first material layer. The first material layer is characterized by including an outer circumferential surface layer configured to cover the outer circumferential surface of the outer ring, and a pair of side surface layers connected to both axial sides of the outer circumferential surface layer and configured to cover both axial side surfaces of the outer ring.

Further, in the second aspect, the same explanation can be given for the same elements as those in the first aspect, and the same effect can be obtained.

According to a constitution of the bearing of the second aspect, as the thermoplastic elastomer is thermally fused to form the outer circumferential surface, the second material layer as an outer circumferential surface layer can be firmly fixed to the first material layer by thermal bonding. Accordingly, it is possible to eliminate the necessity for a sandblast processing process and a process of applying an adhesive agent which have been conventionally required. As a result, it is possible to manufacture the bearing with the enveloping layer of the thermoplastic elastomer at a low cost in large quantities.

Further, since the second material layer is formed of a material softer than the first material layer, a hard material can be used for the first material layer. A soft material is a material having a low bending modulus of elasticity and hardness A (for example, duro hardness A (durometer hardness A)) as described in the first aspect. A hard material is a material having a high bending modulus of elasticity and hardness (for example, duro hardness A (durometer hardness A)). The materials which are usable for the first material layer and the second material layer of the first aspect can be usable for the materials used for the first material layer and the second material layer of the second aspect respectively.

Further, as the first material layer is formed on the outer circumferential surface of the outer ring, the first material layer is formed into an annular shape. Therefore, the first material layer is firmly installed on the outer circumferential surface of the outer ring by contraction when the first material layer is cooled and hardened.

Further, since the second material layer is formed of a material softer than the first material layer, sound (noise) can be reduced in the second material layer when a conveyance object such as a bill, a ticket or the like is conveyed by the outer ring (that is, the second material layer) of the bearing, or when the bearing can be rolled as a wheel of a moving body along a contact object, as described in the first aspect.

Further, the first material layer of the second aspect has the outer circumferential surface layer configured to cover the outer circumferential surface of the outer ring, and the pair of side surface layers connected to both axial sides of the outer circumferential surface layer and configured to cover both axial side surfaces of the outer ring. Due to such a constitution, as the first material layer is cooled and contracted, both axial side surfaces of the outer ring can be sandwiched and held between the pair of side surface layers. Therefore, in the bearing according to the second aspect of the present invention, the first material layer can be firmly fixed to the outer ring, and the first material layer can be prevented from being separated from the outer ring.

Further, preferably, the second material layer may include an outer circumferential surface layer configured to cover the outer circumferential surface of the first material layer, and the pair of side surface layers connected to both axial sides of the outer circumferential surface and configured to cover both axial side surfaces of the pair of side surface layers of the first material layer.

Due to such a constitution, the pair of side surface layers are formed in the second material layer, and both axial side surfaces of the pair of side surface layers of the first material layer are sandwiched by the pair of side surface layers. As a result, as the second material layer is cooled and contacted, both axial side surfaces of the pair of side surface layers of the first material layer can be sandwiched by the pair of side surface layers of the second material layer. Therefore, in the bearing according to the second aspect of the present invention, the second material layer can be more firmly fixed to the first material layer, and thus the second material layer is prevented from being separated from the outer ring.

Further, preferably, the pair of side surface layers of the second material layer may cover both axial side surfaces of the outer ring.

According to such a constitution, the pair of side surface layers of the second material layer is configured to cover both axial side surfaces of the outer ring and to sandwich both axial side surfaces of the first material layer and both axial side surfaces of the outer ring between the pair of side surface layers of the second material layer. As a result, as the second layer is cooled and contracted, both axial side surfaces of the first material layer and both axial side surfaces of the outer ring can be sandwiched between the pair of side surface layers of the second material layer. Therefore, in the bearing according to the second aspect of the present invention, the second material layer can be firmly fixed to the outer ring and the first material layer, and the second material layer can be prevented from being separated from the outer ring.

Preferably, the projecting portion such as a convex portion may be formed in one of the outer circumferential surface of the first material layer and the inner circumferential surface of the second material layer, and the recessed portion such as a concave portion to be engaged with the projecting portion may be formed in the other one of the outer circumferential surface of the first material layer and the inner circumferential surface of the second material layer.

According to such a constitution, the outer circumferential surface of the first material layer and the inner circumferential surface of the second material layer are engaged with each other by the projecting portion and the recessed portion. As a result, it can be more firmly fixed by engaging in addition to thermal bonding. Therefore, in the bearing according to the second aspect of the present invention, the second material layer can be firmly fixed to the first material layer, and thus the second material layer can be prevented from being separated from the outer ring.

Further, according to such a constitution, since the first material layer and the second material layer are engaged with each other by the projecting portion and the recessed portion, it can be firmly fixed to the first material layer without providing the pair of side surface layers in the second material layer. Therefore, in the bearing according to the second aspect of the present invention, it is possible to minimize the axial dimension of the enveloping layer as compared with a case in which the pair of side surface layers are provided in the second material layer, and thus it is possible to reduce the thickness of the entire bearing.

Further, preferably, the projecting portion may be formed on the outer circumferential surface of the first material layer, the recessed portion may be formed in the inner circumferential surface of the second material layer, the axial dimension of the projecting portion may be formed to increase from a radially inner side toward a radially outer side, and the axial dimension of the recessed portion may be formed to increase from the radially inner side toward the radially outer side in correspondence with the projecting portion.

According to such a constitution, the axial dimension of the projecting portion is formed to increase from the radially inner side toward the radially outer side, and the axial dimension of the recessed portion is formed to increase from the radially inner side toward the radially outer side corresponding to the projecting portion. As a result, it is possible to further increase an engaging force between the projecting portion and the recessed portion. Therefore, in the bearing according to the second aspect of the present invention, the second material layer can be more firmly fixed to the first material layer, and the second material layer can be prevented from being separated from the outer ring.

Further, the axial dimension of the first material layer between an outer surface and an outer surface of the pair of side surface layers may be formed to increase from the radially inner side to the radially outer side, and the axial dimension of the second material layer between an inner surface and an inner surface of the pair of side surface layers may be formed to increase from the radially inner side to the radially outer side in correspondence with the pair of side surface layers of the first material layer.

According to such a constitution, the axial dimension of the second material layer between the inner surface and the inner surface of the pair of side surface layers is formed to increase from the radially inner side to the radially outer side in correspondence with the pair of side surface layers of the first material layer. As a result, the engaging force between the first material layer and the second material layer in the radial direction can be improved, and the second material layer can be more firmly fixed to the first material layer. Therefore, the bearing according to the second aspect of the present invention can prevent the second material layer from being separated from the outer ring.

Further, preferably, the pair of side surface layers of the first material layer may cover both axial side surfaces of the outer ring throughout the entire circumference.

According to such a constitution, the pair of side surface layers of the first material layer cover both axial side surfaces of the outer ring over the entire circumference. As a result, as the first material layer is cooled and contracted, both axial side surfaces of the outer ring can be sandwiched by the pair of side surface layers over the entire circumference. Therefore, in the bearing according to the second aspect of the present invention, the first material layer can be more firmly fixed to the outer ring, and the first material layer can be prevented from being separated from the outer ring.

Further, preferably, the first material layer may be formed to have a portion in which the axial dimension gradually increases from the outer circumferential surface of the outer ring toward the radially outer side.

According to such a constitution, since the portion of the first material layer in which the axial direction gradually increases toward the radially outer side is provided, the second material layer can be more firmly fixed to the first material layer. Therefore, it is possible to prevent the second material layer from being separated from the outer ring.

Further, preferably, the second material layer may be formed of a thermoplastic elastomer filled from a gate, and the gate may be formed to have an opening larger than a thickness dimension of the second material layer and may also be disposed to overlap both the second material layer and the first material layer in the axial direction.

According to such a constitution, the gate of the mold used for manufacturing is formed to have an opening larger than the thickness dimension of the second material layer. Also, the gate is disposed to axially overlap both the second material layer and the first material layer, that is, to overlap at least a part of each layer as seen in the axial direction. Due to such a constitution, even when the thickness dimension of the second material layer is reduced, the second material layer can be satisfactorily formed.

Further, the thermoplastic elastomer can be filled on a coated outer circumferential portion of the first material layer with a large pressure. As a result, adhesion between both layers of the second material layer and the first material layer can be enhanced.

In order to solve the above problem, a drive module of the third aspect of the present invention includes the bearing of the second aspect of the present invention.

According to such a constitution, it is possible to secure durability and to realize a low-cost drive module.

Preferred Embodiments of Second Aspect

Hereinafter, preferred embodiments of the second aspect of the present invention will be described with reference to the drawings.

First Embodiment

Figure 13:
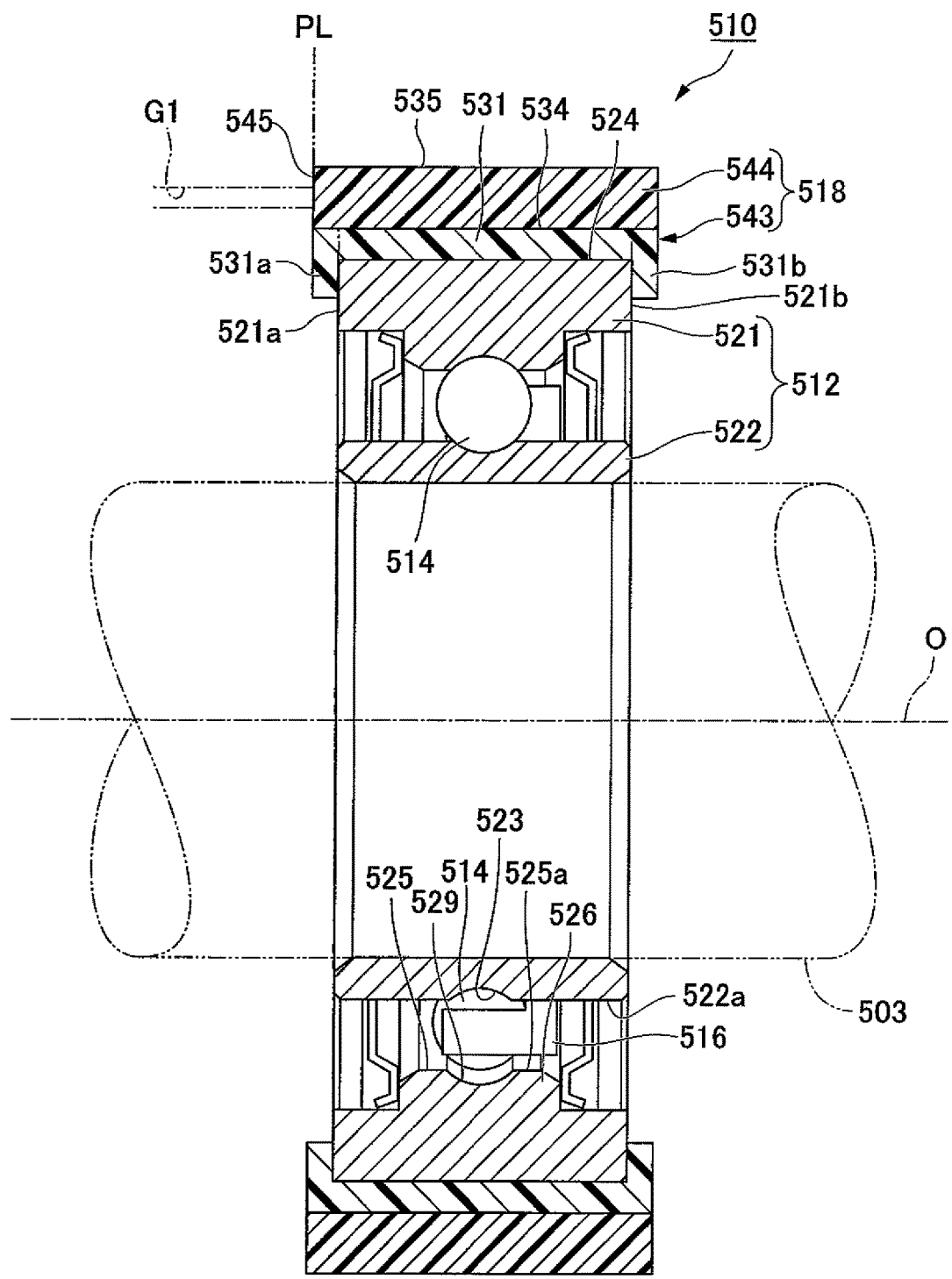
FIG. 13 is a schematic cross-sectional view showing a preferred example of a bearing according to a first embodiment of a second aspect of the present invention.

FIG. 13 is a sectional view of a bearing according to the first embodiment of the present invention.

As shown in FIG. 13, a bearing 510 is a rolling bearing including a ring body 512, a plurality of rolling elements 514, a retainer 516 and an enveloping layer 518.

Further, in the bearings of the first aspect and the second aspect, the characteristics of the enveloping layer are different from each other. The ring body 512, the plurality of rolling elements 514 and the retainer 516 of the bearing of the second aspect shown in FIG. 13 are substantially the same as those of the first embodiment described with reference to FIG. 1 and so on, except that a groove portion is formed in a surface of the outer ring of the ring body, and thus can preferably have the same characteristics. Also, in the bearing of the second aspect, the same groove portion may be provided in the outer ring. The ring body 512 includes an outer ring 521 and an inner ring 522. The outer ring 521 and the inner ring 522 are disposed coaxially with the axis O of the bearing 510, that is, to have the same axis. The inner ring 522 is disposed inside the outer ring 521 in a radial direction. The inner ring 522 is fixed to a support shaft 503.

The plurality of rolling elements 514 are annularly arranged between the outer ring 521 and the inner ring 522 which constitute the ring body 512. The retainer 516 holds the plurality of rolling elements 514 rollably in a state in which the rolling elements 514 are evenly arranged in a circumferential direction.

The outer ring 521 may be formed of an arbitrarily selected material and is formed of a metal material such as stainless steel. The outer ring 521 is a cylindrical member. The outer ring 521 can be formed by an arbitrarily selected method and is formed, for example, by forging, mechanical processing, or the like. The outer ring 521 has an outer circumferential surface 524, an inner circumferential surface 525 and a central portion 526.

The outer circumferential surface 524 is annularly formed on an outer side of the outer ring 521 in the radial direction. The inner circumferential surface 525 is a surface annularly formed on an inner side of the outer ring 521 in the radial direction. The central portion 526 is a surface formed at a center in an axis O direction. The central portion 526 is formed so that an area 525a of the inner circumferential surface 525 at a center in the axis O direction protrudes toward a radially inner side.

An outer ring rolling surface 529 is formed in the area 525a of the central portion 526 of the inner circumferential surface 525 of the outer ring. The outer ring rolling surface 529 is formed at a center of the inner circumferential surface in the axis O direction. The outer ring rolling surface 529 is formed so that a cross section of a side surface is formed in an arc shape along outer surfaces of the rolling elements 514. A radius of curvature in a cross section of the outer ring rolling surface 529 is set to be substantially the same as or slightly larger than a radius of curvature of the outer surfaces of the rolling elements 514. The outer ring rolling surface 529 is formed on the entire circumference of the inner circumferential surface 525 of the outer ring 521. The outer surfaces of the plurality of rolling elements 514 can be brought into contact with the outer ring rolling surface 529.

The inner ring 522 may be formed of an arbitrarily selected material and is formed of a metal material such as stainless steel. The inner ring 522 is a substantially cylindrical member having a predetermined thickness dimension in the axis O direction. The inner ring 522 may be formed by an arbitrarily selected method and is formed, for example, by forging, mechanical processing, or the like.

An inner ring rolling surface 523 is formed at an intermediate portion of an outer circumferential surface 522a of the inner ring 522 in the axis O direction. The inner ring rolling surface 523 is formed so that a cross section of a side surface is formed in an arc shape along the outer surfaces of the rolling elements 514. A radius of curvature of the cross section of the inner ring rolling surface 523 is set to be substantially the same as or slightly larger than the radius of curvature of the outer surfaces of the rolling elements 514. The inner ring rolling surface 523 is formed on the entire circumference of an outer circumferential surface 522a of the inner ring 522. The outer surfaces of the plurality of rolling elements 514 can be brought into contact with the inner ring rolling surface 523.

As the inner ring 522 of the bearing 510 is fixed to the support shaft 503, the enveloping layer 518 rotates with the outer ring 521. An outer circumferential surface 535 of the enveloping layer 518 (second material layer 544) is a surface which conveys, for example, a bill, a ticket, or the like or a surface which rolls on a contact object 505 (refer to FIG. 4).

The rolling elements 514 are formed of an arbitrarily selected material, for example, a metal material such as stainless steel or a ceramic material such as zirconia or the like in a spherical shape. The plurality of rolling elements 514 are disposed between the outer ring rolling surface 529 of the outer ring 521 and the inner ring rolling surface 523 of the inner ring 522. The rolling elements 514 roll along the outer ring rolling surface 529 and the inner ring rolling surface 523. The plurality of rolling elements 514 are evenly and annularly arranged by the retainer 516 to be rollable in the circumferential direction. Grease for lubrication is sealed on the bearing 510.

The enveloping layer 518 is formed on the outer circumferential surface 524 of the outer ring 521. The enveloping layer 518 includes a first material layer 543 and a second material layer 544.

(First Material Layer)

The first material layer 543 is formed on the outer circumferential surface 524 of the outer ring 521. The first material layer 543 is formed on the outer circumferential surface 524 of the outer ring 521 by an arbitrarily selected method, for example, preferably by insert molding through injection molding. The first material layer 543 has an outer circumferential surface layer 531 and a pair of side surface layers 531a and 531b. The outer circumferential surface layer 531 covers the outer circumferential surface 524 of the outer ring 521. A pair of side surface layers 531a and 531b are connected to both sides of the outer circumferential surface layer 531 in the axis O direction. The pair of side surface layers 531a and 531b cover both axial side surfaces 521a and 521b of the outer ring 521 throughout the entire circumference.

The first material layer 543 is formed of an arbitrarily selected material and is formed of, for example, a hard plastic. Particularly, the first material layer 543 is preferably formed of an amorphous plastic because it is excellent in thermal adhesiveness to a thermoplastic elastomer. As an example of the amorphous plastic, polycarbonate, ABS resin, or an alloy material of polycarbonate and ABS resin, or the like is preferable. When the first material layer 543 is cooled, a force is applied by the first material layer 543 so that the first material layer 543 comes into close contact with the outer circumferential surface 524 toward a center of the outer ring 521 (in the radial direction). Therefore, the first material layer 543 is well fixed to the outer circumferential surface 524 of the outer ring 521 by injection molding.

The first material layer 543 is preferably formed in an annular shape of hard plastic along the outer circumferential surface 524.

Therefore, the first material layer 543 is firmly installed on the outer circumferential surface 524 by contraction when the first material layer 543 is cooled and hardened.

Here, the first material layer 543 has the outer circumferential surface layer 531 which covers the outer circumferential surface 524 of the outer ring 521, and the pair of side surface layers 531a and 531b which are connected to both sides of the outer circumferential surface layer 531 of the first material layer 543 in the axis O direction and cover both axial side surface 521a and 521b of the outer ring 521. Due to such a constitution, as the first material layer 543 is cooled and contracted, both axial side surfaces 521a and 521b of the outer ring 521 can be sandwiched between the pair of side surface layers 531a and 531b. Therefore, the first material layer 543 is firmly fixed to the outer ring 521.

When the first material layer 543 is insert-molded on the outer circumferential surface 524 of the outer ring 521, the bearing 510 is preferably accommodated in the molding die and both the axial side surfaces 521a and 521b of the outer ring 521 are supported in contact with the molding die. In this way, the first material layer 543 may be insert-molded on the outer circumferential surface 524 of the outer ring 521 by supporting both side surfaces 521a and 521b with the molding die. Further, the first material layer 543 may be insert-molded to a simple body of the outer ring 521.

(Second Material Layer)

The second material layer 544 is formed on an outer circumferential surface 534 (outer surface) of the first material layer 543. The second material layer 544 is an outer circumferential surface layer which forms the outer circumferential surface 535 of the enveloping layer 518.

The second material layer 544 is formed of a thermoplastic elastomer (TPE). The thermoplastic elastomer is excellent in thermal adhesiveness to an amorphous plastic which is a preferred material of the first material layer 543.

For example, styrenes (TPS), olefins (TPO), polyvinyl chlorides (PPVC), urethanes (TPU) or polyesters (TPEE) may be applied as the thermoplastic elastomer. In view of mechanical strength and wear resistance, urethanes (TPU), polyesters (TPEE) and styrenes (TPS) are preferable. More preferably, polyesters (TPEE) are exemplary examples of the thermoplastic elastomer.

While urethanes (TPU) have the most excellent wear resistance, a forming property is slightly deteriorated, and sufficient drying is necessary due to high hygroscopicity. Further, annealing is also necessary, and forming accuracy is also slightly degraded while manufacture thereof is time-consuming. However, among thermoplastic elastomers, urethanes have the most excellent mechanical strength and wear resistance. For this reason, preferably, urethanes are used in the enveloping layer 518 when properties such as mechanical strength, wear resistance, or the like are necessary.

Among thermoplastic elastomers, aside from urethanes, polyesters (TPEE) are most excellent in wear resistance and mechanical strength and also excellent in thermal adhesiveness to hard plastics or the like. In addition, polyesters (TPEE) are optimal as a material for the enveloping layer 518 because the hygroscopicity is also low and the forming property is also good.

Here, as the thermoplastic elastomer of the second material layer 544, polyesters (TPEE) are more preferable. Polyesters are excellent in wear resistance and mechanical strength and also excellent in thermal adhesiveness to hard plastics (that is, the first material layer 543).

Thermal bonding refers to, for example, that the thermoplastic elastomer of the second material layer 544 is melted by heating and adhered to the hard plastic (the outer circumferential surface 524 of a ring body 512 of a sliding bearing).

Therefore, it is effective at the time of two color molding (different material molding). Further, polyesters (TPEE) are optimal as a material for the second material layer 544 of the bearing 510 because hygroscopicity is also low and a forming property is also good.

In view of suppression of sound (noise), duro hardness A of the second material layer 544 is desirably 75 to 95. For example, as the duro hardness A is 92, it is particularly preferable in view of the fact that the sound (noise) is appropriately suppressed and the mechanical strength or the wear resistance of the second material layer 544 is appropriately secured. When the duro hardness A is equal to or more than 75, the mechanical strength or the wear resistance of the second material layer 544 does not become a problem.

The thermoplastic elastomer of the second material layer 544 is a material softer than the amorphous plastic (hard plastic) of the first material layer 543. That is, a hard amorphous plastic can be used for the first material layer 543. In this case, the first material layer 543 is injection-molded in a molten state on the outer circumferential surface 524 of the outer ring 521, and after the injection molding, the first material layer 543 in the molten state cools and solidifies, and thus the annular first material layer 543 contracts. Therefore, the first material layer 543 can be firmly fixed to the outer circumferential surface 524 of the outer ring 521.

The soft material is a material of which a bending modulus of elasticity and/or a hardness (for example, duro hardness A (durometer hardness A)) is smaller than that of the first material layer.

The hard material is a material of which a bending modulus of elasticity and a hardness (for example, duro hardness A (durometer hardness A)) are larger than that of the first material layer. For the preferred examples of these values of each layer, the values described in the first aspect can likewise preferably be used.

Next, the function and effect of the bearing 510 of the first embodiment will be described.

The bearing 510 of the first embodiment has the enveloping layer 518 formed on the outer circumferential surface 524 of the outer ring 521. The enveloping layer 518 includes the first material layer 543 formed on the outer circumferential surface 524 of the outer ring 521, and the second material layer 544 as an outer circumferential surface layer which forms an outer circumferential surface 535 of the enveloping layer 518 by thermally fusing a thermoplastic elastomer to the outer circumferential surface 534 of the first material layer 543. The second material layer 544 is a material softer than the first material layer 543. The first material layer 543 has the outer circumferential surface layer 531 which covers the outer circumferential surface 524 of the outer ring 521, and the pair of side surface layers 531a and 531b connected to both sides of the outer circumferential surface layer 531 in the axis O direction and configured to cover both axial side surfaces 521a and 521b of the outer ring 521.

According to such a constitution, as the thermoplastic elastomer is thermally fused to form the outer circumferential surface 535, the second material layer 544 as the outer circumferential surface layer can be firmly fixed by thermal bonding. Therefore, it is possible to eliminate the necessity for a sandblast processing process and a coating process with an adhesive which have been conventionally required.

As a result, it is possible to manufacture the bearing 510 with the enveloping layer 518 formed of the thermoplastic elastomer at a low cost in large quantities.

Further, since the second material layer 544 is formed of a material softer than the first material layer 543, a hard material can be used for the first material layer 543. A soft material is a material having a low bending modulus of elasticity and hardness A (for example, duro hardness A (durometer hardness A)) as described in the first aspect. A hard material is a material having a high bending modulus of elasticity and hardness A (for example, duro hardness A (durometer hardness A)).

Further, as the first material layer 543 is formed on the outer circumferential surface 524 of the outer ring 521, the first material layer 543 is formed into an annular shape. Therefore, the first material layer 543 is firmly installed on the outer circumferential surface 524 of the outer ring 521 by contraction when the first material layer 543 is cooled and hardened.

Further, since the second material layer 544 is formed of a material softer than the first material layer 543, sound (noise) can be reduced in the second material layer 544 when a conveyance object such as a bill, a ticket or the like is conveyed by the outer ring (that is, the second material layer 544) of the bearing 510, or when the bearing 510 can be rolled as a wheel of a moving body along a contact object, as described in the first aspect.

Further, the first material layer 543 of the second aspect has the outer circumferential surface layer 531 configured to cover the outer circumferential surface 524 of the outer ring 521, and the pair of side surface layers 531a and 531b connected to both sides of the outer circumferential surface layer 531 in the axis O direction and configured to cover both axial side surfaces 521a and 521b of the outer ring 521. Accordingly, as the first material layer 543 is cooled and contracted, both axial side surfaces 521a and 521b of the outer ring 521 can be sandwiched and held between the pair of side surface layers 531a and 531b. Therefore, in the bearing 510 according to the embodiment, the first material layer 543 can be firmly fixed to the outer ring 521, and the first material layer 543 can be prevented from being separated from the outer ring 521.

Further, the pair of side surface layers 531a and 531b of the first material layer 543 cover both axial side surfaces 521a and 521b of the outer ring 521 over the entire circumference. Therefore, as the first material layer 543 is cooled and contracted, both axial side surfaces 521a and 521b of the outer ring 521 can be sandwiched by the pair of side surface layers 531a and 531b over the entire circumference. Accordingly, the bearing 510 of the present embodiment can more strongly fix the first material layer 543 to the outer ring 521 and can prevent the first material layer 543 from being separated from the outer ring 521.

As described above, the first material layer 543 and the second material layer 544 of the enveloping layer 518 are formed, for example, by two-color molding. Specifically, the first material layer 543 can be formed on the outer circumferential surface 524 of the outer ring 521 by insert molding through injection molding of amorphous plastic. After the first material layer 543 is insert-molded, the second material layer 544 can be insert-molded by injection molding of a thermoplastic elastomer.

A mold can be used to injection-mold the first material layer 543 and the second material layer 544. Particularly, in the mold for injection-molding the second material layer 544, a gate G1 of the mold is preferably disposed at a position corresponding to one side (left side in FIG. 13) of the second material layer 544 in the axis O direction. As an inside (cavity) of the mold is filled with the molten thermoplastic elastomer from the gate G1, the second material layer 544 is formed on the first material layer 543 by insert molding.

As the gate G1 of the mold is provided at a position corresponding to one side of the second material layer 544 in the axis O direction, a filling place of the thermoplastic elastomer can be shifted from the outer circumferential surface 535 of the second material layer 544.

Further, for example, a parting line PL of the mold is preferably located on an outer surface 545 of the second material layer 544 in the axis O direction of the bearing 510. The parting line PL is preferably disposed at a position shifted from the outer circumferential surface 535 of the second material layer 544.

As described above, since the gate G1 or the parting line PL is shifted from the outer circumferential surface 535, burrs generated when the mold is filled with the thermoplastic elastomer from the gate G1 or burrs caused by the parting line PL or the like can be prevented from occurring on the outer circumferential surface 35. Accordingly, it is possible to remove the necessity of post processing for removing burrs from the outer circumferential surface 535.

Incidentally, as described in the first aspect, a mold temperature when the amorphous plastic or the thermoplastic elastomer is injection-molded is minimized to a low level of 150° C. or less (preferably, 100° C. or less). In addition, when the inside of the mold is filled with the melted amorphous plastic or thermoplastic elastomer from the gate G1, the amorphous plastic or the thermoplastic elastomer is solidified instantaneously. Accordingly, when the melted amorphous plastic or thermoplastic elastomer is molded, it is possible to prevent high temperature from being transmitted to the grease sealed in the bearing 510. Accordingly, there is no concern of deterioration of the grease due to the temperature of the amorphous plastic or melted thermoplastic elastomer.

As in the first aspect, since the enveloping layer 518 can also be welded to the outer circumferential surface 524 in the second aspect, it is not necessary to bond the enveloping layer 518 to the outer circumferential surface 524 with an adhesive agent. As the adhesive agent is not interposed between the enveloping layer 518 and the outer circumferential surface 524, the effect described in the first aspect can be obtained.

As the enveloping layer 518 is welded to the outer circumferential surface 524, the enveloping layer 518 needs not be adhered to the outer circumferential surface 524 by an adhesive agent. Accordingly, even when the bearing 510 has a small size and the thickness dimension of the enveloping layer 518 is less than, for example, 1.0 mm, hardness of the enveloping layer 518 can be evenly maintained throughout the entire circumference. Accordingly, even when the bearing 510 is formed in a compact shape, generation of sound (noise) or causing of torque nonuniformity can be minimized when the conveyance object is conveyed by the bearing 510 and when the bearing 510 rolls along the contact object.

Further, the example in which the enveloping layer 518 is provided by welding only on the outer circumferential surface 524 has been described in the first embodiment. However, the enveloping layer 518 may be provided on the outer circumferential surface 524 using, for example, an adhesive agent in combination with welding according to the use of the bearing 510.

An example in which polycarbonate or the like is used as the hard plastic (amorphous plastic) for the first material layer 543 of the enveloping layer 518 has been described in the first embodiment. However, as in the first aspect, for example, a thermoplastic elastomer may be used in the same manner as in the second material layer 544.

In this case, the first material layer 543 and the second material layer 544 can be thermally bonded more satisfactorily. Accordingly, it is possible to more firmly fix the second material layer 544 to the first material layer 543 and thus to more reliably prevent the second material layer 544 from being separated from the outer ring 521.

Here, as described in the first aspect with reference to Table 1 and FIG. 2, for example, to secure excellent abrasion quantity of the second material layer 544, a composition containing potassium titanate fibers in the thermoplastic elastomer and exhibiting excellent properties can also be employed for the second material layer in the second aspect.

Modified Example

Next, a modified example of the bearing 50 of the first embodiment will be described.

Although an example of the first embodiment has been described with reference to FIG. 3, FIG. 3 may be considered as a side view showing a modified example of the bearing according to the first embodiment of the second aspect. Apart from the differences between the first and second aspects, it is possible to have the same constitution and the same effect as described in the first aspect. The preferred features are also the same.

Example of Use of Bearing 510

Next, an example of a use of the bearing 510 according to the first embodiment will be described with reference to FIG. 4.

FIG. 4 shows an example of the first aspect, but it may be considered as a side view showing the moving body 1 with the bearing according to the first embodiment of the second aspect. Apart from the difference between the first and second aspects, it is possible to have the same constitution and the same effect as described in the first aspect. The preferred features and examples are also the same.

Next, the bearings of the second embodiment to the seventh embodiment of the second aspect will be described with reference to FIGS. 14 to 19. Further, in the bearings of the second embodiment to the seventh embodiment, the same members as and similar members to the bearing 510 of the first embodiment are designated by the same reference numerals, and a detailed description thereof will be omitted.

Second Embodiment

Figure 14:
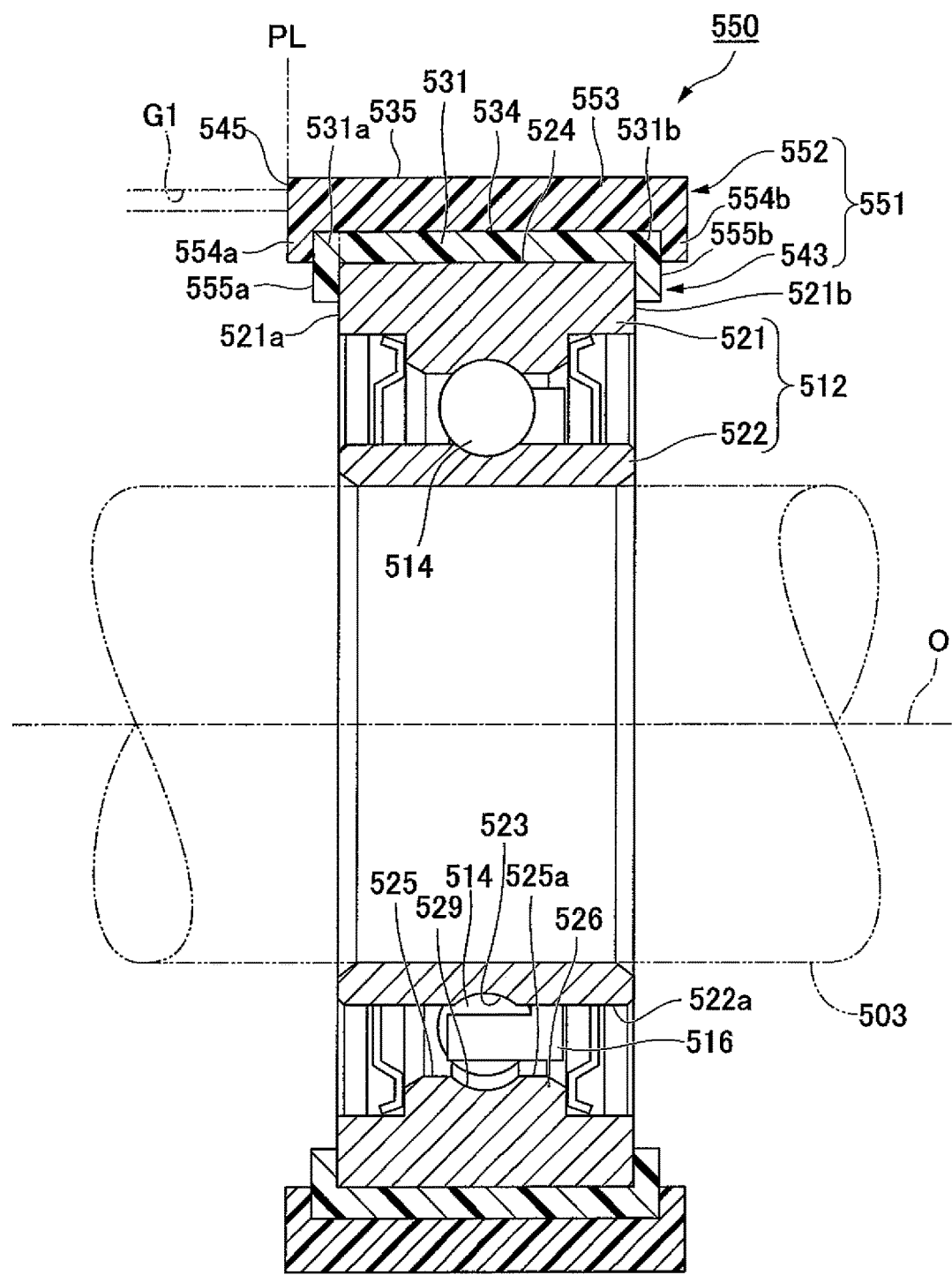
FIG. 14 is a schematic cross-sectional view showing a preferred example of a bearing according to a second embodiment of the second aspect of the present invention.

FIG. 14 is a schematic cross-sectional view of a bearing according to the second embodiment of the second aspect of the present invention.

As shown in FIG. 14, in a bearing 550 of the second embodiment, an enveloping layer 551 is formed on the outer circumferential surface 524 of the outer ring 521. The enveloping layer 551 includes the first material layer 543 and a second material layer 552.

The second material layer 552 includes an outer circumferential surface layer 553 and a pair of side surface layers 554*a* and 554*b*.

The outer circumferential surface layer 553 covers the outer circumferential surface 534 of the first material layer 543. The pair of side surface layers 554*a* and 554*b* of the second material layer are connected to both sides of the outer circumferential surface layer 553 of the second material layer in the axis O direction. The pair of side surface layers 554*a* and 554*b* cover the pair of side surface layers 531*a* and 531*b* of the first material layer 543. Specifically, the pair of side surface layers 554*a* and 554*b* cover a region on the outer circumferential side of a radially intermediate portion of both axial side surfaces 555*a* and 555*b* of the side surface layers 531*a* and 531*b* throughout the entire circumference thereof.

In the second embodiment, the pair of side surface layers 554*a* and 554*b* are formed in the second material layer 552, and both axial side surfaces 555*a* and 555*b* of the pair of side surface layers 531*a* and 531*b* in the first material layer 543 are sandwiched between the pair of side surface layers 554*a* and 554*b*. Therefore, as the second material layer 552 is cooled and contracted, both axial side surfaces 555*a* and 555*b* of the pair of side surface layers 531*a* and 531*b* in the first material layer 543 can be sandwiched by the pair of side surface layers 554*a* and 554*b* of the second material layer 552. Accordingly, the bearing 550 of the embodiment can further firmly fix the second material layer 552 to the first material layer 543 and can prevent the second material layer 552 from being separated from the outer ring 521.

Third Embodiment

Figure 15:
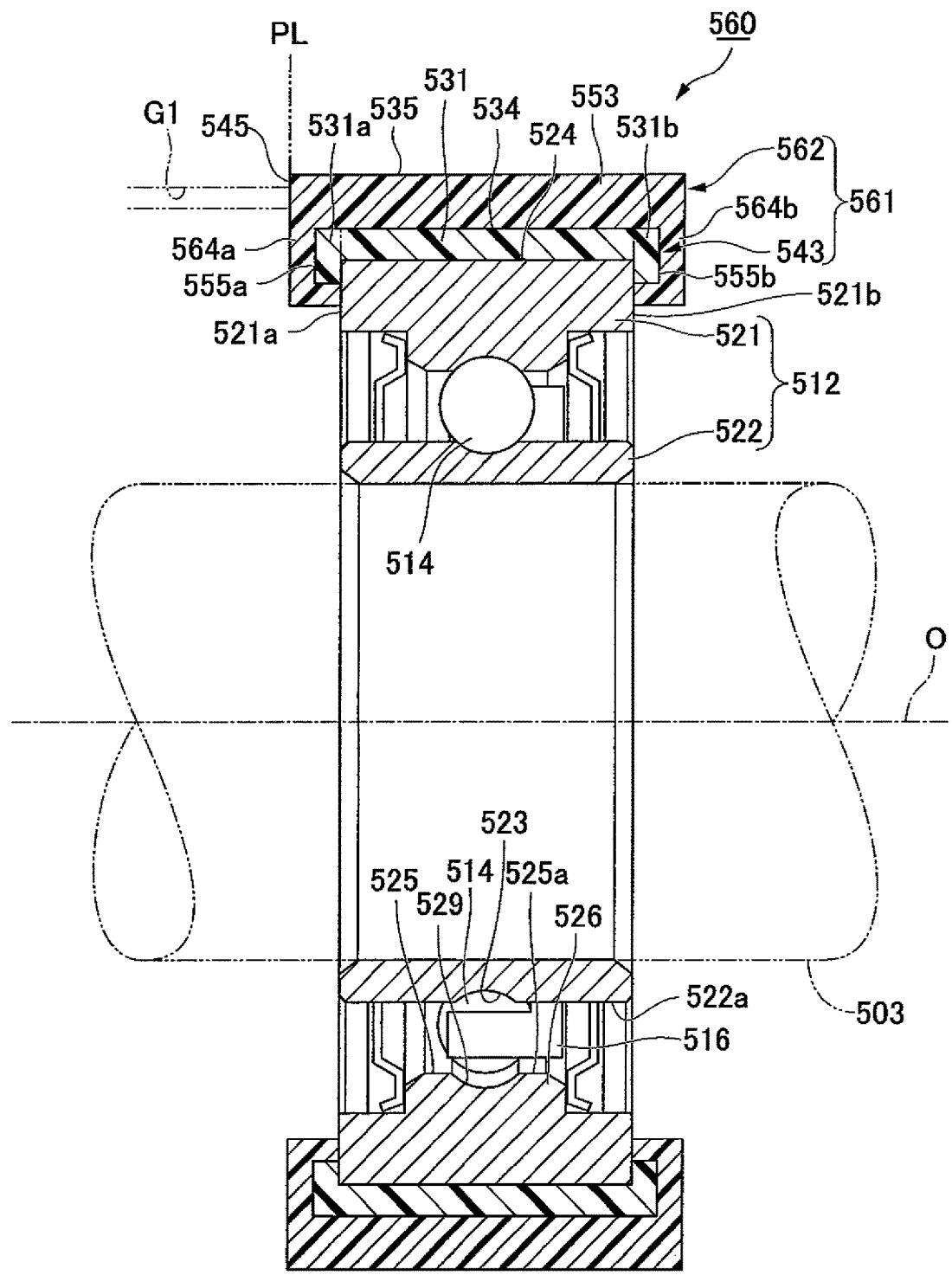
FIG. 15 is a schematic cross-sectional view showing a preferred example of a bearing according to a third embodiment of the second aspect of the present invention.

FIG. 15 is a schematic cross-sectional view of a bearing according to the third embodiment of the second aspect of the present invention.

As shown in FIG. 15, in a bearing 560 of the third embodiment, an enveloping layer 561 is formed on the outer circumferential surface 524 of the outer ring 521. The enveloping layer 561 includes the first material layer 543 and a second material layer 562. A length of the pair of side surface layers of the first material layer is shorter than that of the first and second embodiments.

The second material layer 562 includes an outer circumferential surface layer 553 and a pair of side surface layers 564a and 564b.

The pair of side surface layers 564a and 564b of the second material layer are connected to both sides of the outer circumferential surface layer 553 in the axis O direction. The pair of side surface layers 564a and 564b of the second material layer cover both axial side surfaces 555a and 555b of the first material layer 543 over the entire circumference, and the side surface layers also cover about the radially intermediate portion of both axial side surfaces 521a and 521b of the outer ring 521 over the entire circumference.

In the third embodiment, the pair of side surface layers 564a and 564b of the second material layer 562 cover both axial side surfaces 521a and 521b of the outer ring 521. Both axial side surfaces 555a and 555b of the first material layer 543 and both axial side surfaces 521a and 521b of the outer ring 521 are sandwiched between the pair of side surface layers 564a and 564b of the second material layer 562. Therefore, as the second material layer 562 is cooled and contracted, both axial side surfaces 555a and 555b of the first material layer 543 and both axial side surfaces 521a and 521b of the outer ring 521 are sandwiched by the pair of side surface layers 564a and 564b of the second material layer 562. Accordingly, the bearing 560 of the embodiment can further firmly fix the second material layer 562 to the outer ring 521 and the first material layer 543 and can prevent the second material layer 562 from being separated from the outer ring 521.

Fourth Embodiment

Figure 16:
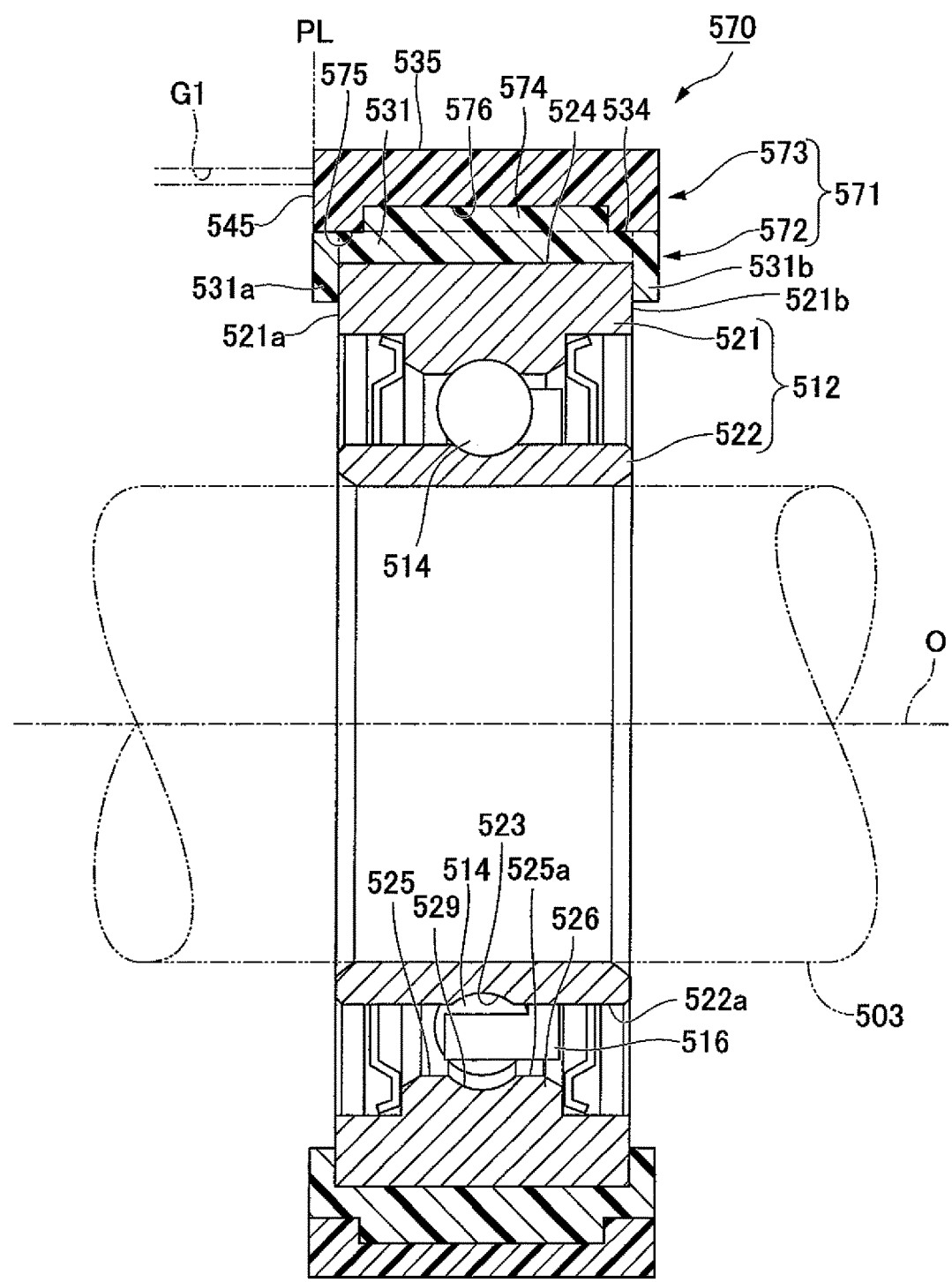
FIG. 16 is a schematic cross-sectional view showing a preferred example of a bearing according to a fourth embodiment of the second aspect of the present invention.

FIG. 16 is a schematic cross-sectional view of a bearing according to the fourth embodiment of the second aspect of the present invention.

As shown in FIG. 16, in a bearing 570 of the fourth embodiment, an enveloping layer 571 is formed on the outer circumferential surface 524 of the outer ring 521. The enveloping layer 571 includes a first material layer 572 and a second material layer 573.

A projecting portion 574 as a part of the first material layer is further formed on an outer circumferential surface 534 of the first material layer 572 to protrude. Specifically, the projecting portion 574 is formed on the outer circumferential surface 534 of the outer circumferential surface layer 531 of the first material layer 572 so that a cross section thereof has a square shape. A recessed portion 576 corresponding to the projecting portion 574 is formed on an inner circumferential surface 575 of the second material layer 573. The recessed portion 576 and the projecting portion 574 are engaged with each other.

According to the fourth embodiment, the outer circumferential surface 534 of the first material layer 572 and an inner circumferential surface 575 of the second material layer 573 are engaged with each other by the projecting portion 574 and the recessed portion 576. As a result, it can be more firmly fixed by engaging in addition to thermal bonding. Accordingly, the bearing 570 of the embodiment can firmly fix the second material layer 573 to the first material layer 572 and can prevent the second material layer 573 from being separated from the outer ring 521.

Further, according to the fourth embodiment, the second material layer 573 and the first material layer 572 are engaged with each other by the projecting portion 574 and the recessed portion 576. As a result, the second material layer 573 can be fixed to the first material layer 572 without providing a pair of side surface layers on the second material layer 573. Accordingly, the bearing 570 of the embodiment can minimize a dimension of the enveloping layer 571 in the axis O direction as compared with the case in which the pair of side surface layers are provided on the second material layer 573, and thus the entire thickness of the bearing 570 can be reduced.

Fifth Embodiment

Figure 17:
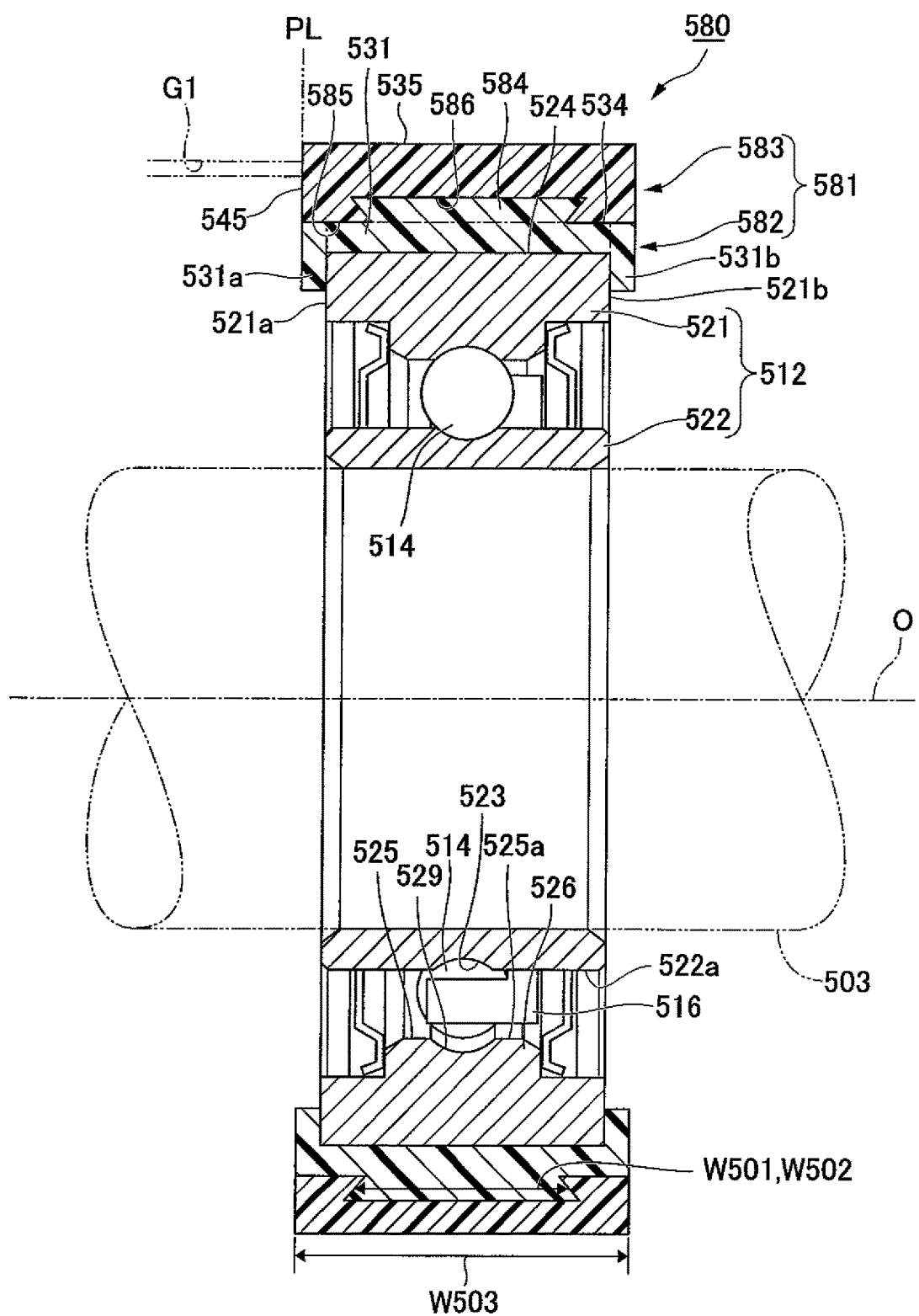
FIG. 17 is a schematic cross-sectional view showing a preferred example of a bearing according to a fifth embodiment of the second aspect of the present invention.

FIG. 17 is a cross-sectional view of a bearing according to the fifth embodiment of the present invention.

As shown in FIG. 17, in a bearing 580 of the fifth embodiment, an enveloping layer 581 is formed on the outer circumferential surface 524 of the outer ring 521. The enveloping layer 581 includes a first material layer 582 and a second material layer 583.

A projecting portion 584 as a part of the first material layer is further formed on the outer circumferential surface 534 of the first material layer 582 to protrude outward in a radial direction. Specifically, the projecting portion 584 is formed on the outer circumferential surface 534 of the outer circumferential surface layer 531 of the first material layer 582. A recessed portion 586 corresponding to the projecting portion 584 is formed on an inner circumferential surface 585 of the second material layer 583. The recessed portion 586 is engaged with the projecting portion 584. The projecting portion 584 has a trapezoidal cross section or a shape opposite thereto.

A dimension W501 (width) of the projecting portion 584 in the axis O direction is formed to gradually increase from a radially inner side toward a radially outer side. A dimension W502 (width) of the recessed portion 586 in the axis O direction is formed to gradually decrease from the radially outer side toward the radially inner side.

According to the fifth embodiment, the outer circumferential surface 534 of the first material layer 582 and the inner circumferential surface 585 of the second material layer 583 are engaged with each other by the projecting portion 584 and the recessed portion 586. As a result, it can be more firmly fixed by engaging in addition to thermal bonding. Accordingly, the bearing 580 of the fifth embodiment can firmly fix the second material layer 583 to the first material layer 582 and can prevent the second material layer 583 from being separated from the outer ring 521.

Further, according to such a constitution, the second material layer 583 and the first material layer 582 are engaged with each other by the projecting portion 584 and the recessed portion 586. As a result, the second material layer 583 can be fixed to the first material layer 582 without providing the pair of side surface layers on the second material layer 583. Accordingly, the bearing 580 of the embodiment can minimize a dimension W503 of the enveloping layer 581 in the axis O direction as compared with the case in which the pair of side surface layers are provided on the second material layer 583. As a result, the entire thickness of the bearing 580 can be reduced.

Further, the dimension W501 of the projecting portion 584 in the axis O direction is formed to increase from the radially inner side to the radially outer side. The dimension W502 of the recessed portion 586 in the axis O direction is formed to increase from the radially inner side to the radially outer side in correspondence with the projecting portion 584. Accordingly, an engaging force between the projecting portion 584 and the recessed portion 586 can be further increased. Therefore, the bearing 580 of the embodiment can further firmly fix the second material layer 583 to the first material layer 582 and can prevent the second material layer 583 from being separated from the outer ring 521.

Sixth Embodiment

Figure 18:
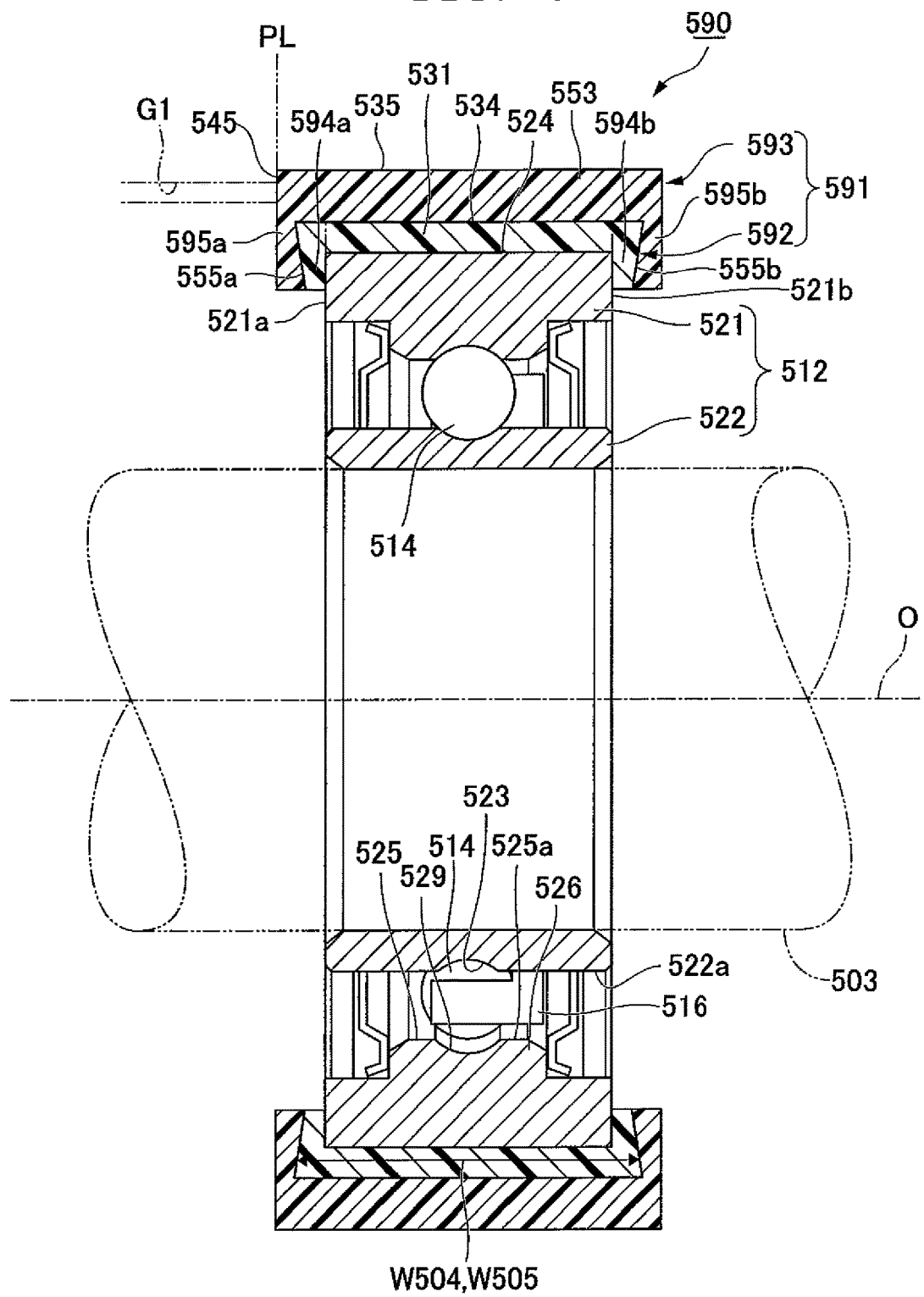
FIG. 18 is a schematic cross-sectional view showing a preferred example of a bearing according to a sixth embodiment of the second aspect of the present invention.

FIG. 18 is a schematic cross-sectional view of a bearing according to the sixth embodiment of the second aspect of the present invention.

As shown in FIG. 18, in a bearing 590 of the sixth embodiment, an enveloping layer 591 is formed on the outer circumferential surface 524 of the outer ring 521. The enveloping layer 591 includes a first material layer 592 and a second material layer 593. The first material layer 592 has the outer circumferential surface layer 531 and a pair of side surface layers 594a and 594b. The second material layer 593 has an outer circumferential surface layer 553 and a pair of side surface layers 595a and 595b.

The distance between both axial side surfaces 555a and 555b in the pair of side surface layers 594a and 594b of the first material layer 592, that is, a dimension W504 (width) in the axis O direction is formed to gradually increase from a radially inner side toward a radially outer side. Correspondingly, a dimension W505 (width) between the inner surfaces of the pair of side surface layers 595a and 595b of the second material layer 593 in the axis O direction gradually decreases from the radially outer side to the radially inner side.

According to the sixth embodiment, a dimension W505 between the inner surfaces of the pair of side surface layers 595a and 595b of the second material layer 593 in the axis O direction is formed to increase from the radially inner side to the radially outer side in correspondence with the pair of side surface layers 594a and 594b of the first material layer 592. As a result, an engaging force between the first material layer 592 and the second material layer 593 in the radial direction can be improved, and the second material layer 593 can be more firmly fixed to the first material layer 592. Therefore, the bearing 590 of the embodiment can prevent the second material layer 593 from being separated from the outer ring 521.

Seventh Embodiment

Figure 19:
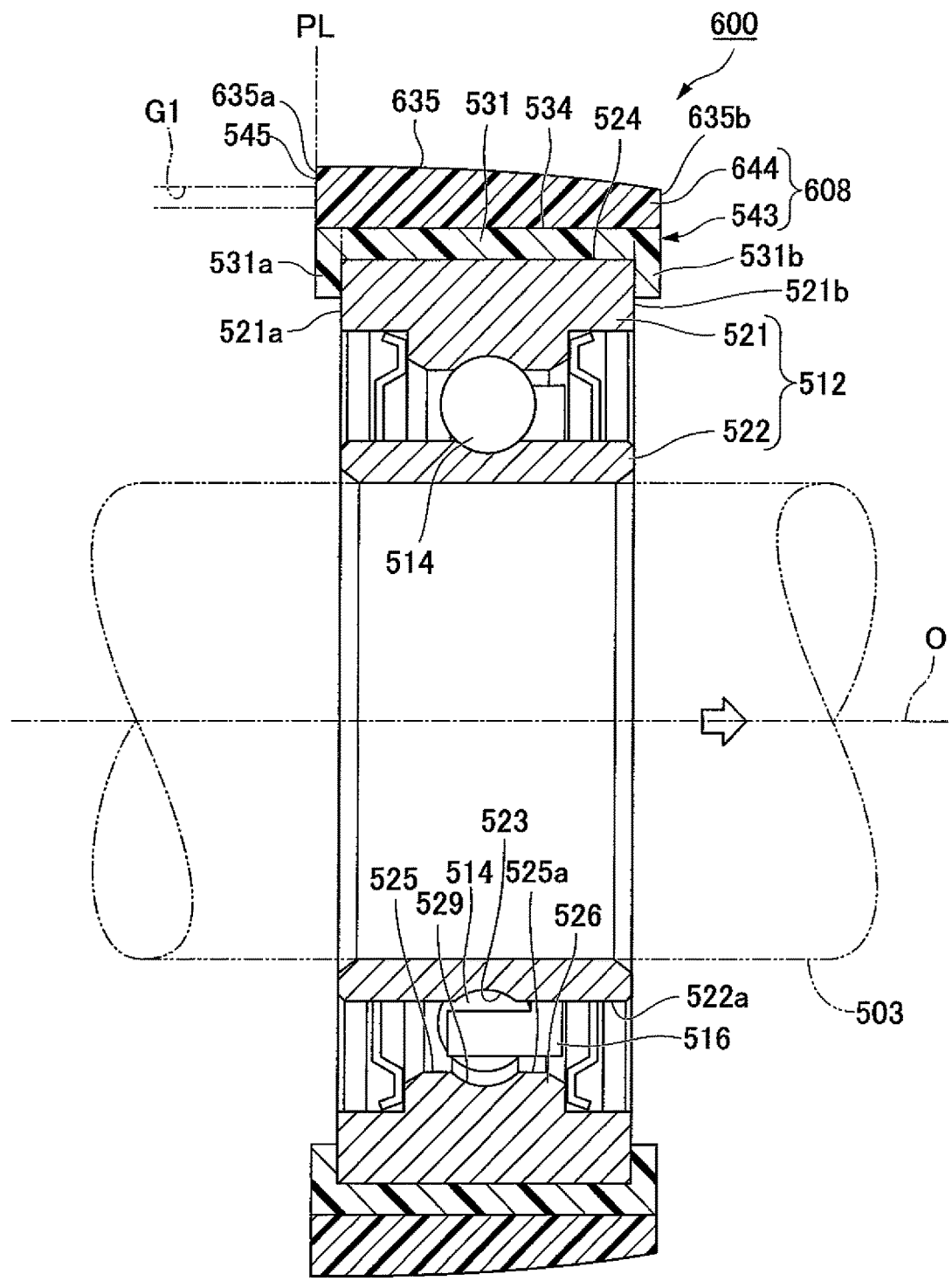
FIG. 19 is a schematic cross-sectional view showing a preferred example of a bearing according to a seventh embodiment of the second aspect of the present invention.

FIG. 19 is a schematic cross-sectional view of a bearing according to the seventh embodiment of the second aspect of the present invention.

As shown in FIG. 19, a bearing 600 is the same as the bearing 10 of the first embodiment except that the enveloping layer 518 of the first embodiment is replaced by an enveloping layer 608. The enveloping layer 608 is obtained by replacing the second material layer 544 of the first embodiment with a second material layer 644 and further includes the first material layer 543 which is the same as that of the first embodiment.

The second material layer 644 forms an outer circumferential surface layer of the enveloping layer 608. The second material layer 644 has an outer circumferential surface layer forming an outer circumferential surface 635 of the enveloping layer 608. The outer circumferential surface 635 is obtained by replacing the outer circumferential surface 535 of the first embodiment with the curved outer circumferential surface 635, and the other portions are the same as the outer circumferential surface 535 of the first embodiment.

The second material layer 644 has a first end portion 635a disposed on one side (left side in FIG. 19) in the axis O direction, and a second end portion 635b disposed on the other side (right side in FIG. 19) in the axis O direction. The outer circumferential surface 635 is formed in a curved shape so that an outer diameter gradually decreases from the first end portion 635a to the second end portion 635b. The outer circumferential surface 635 may be linearly formed so that the outer diameter gradually decreases.

A parting line PL of a mold is positioned at the first end portion 635a. That is, the outer circumferential surface 635 is formed in a curved shape so that the outer diameter gradually decreases from the parting line PL to the second end portion 635b. Therefore, after the enveloping layer 608 (the first material layer 543 and the second material layer 644) is insert-molded, generation of burrs on the outer circumferential surface 635 can be minimized by opening a movable die of the mold in the arrow direction.

Therefore, it is possible to eliminate the need for post-processing in which burrs are removed from the outer circumferential surface 635 after the enveloping layer 608 (the first material layer 543 and the second material layer 644) is insert-molded on the outer circumferential surface 524 of the outer ring 521.

According to the bearing 600 of the seventh embodiment, the outer diameter of the outer circumferential surface 635 gradually decreases. Therefore, similar to the description in the sixth embodiment of the first aspect, when a bill, a ticket, or the like is conveyed by the outer circumferential surface 635 or the outer circumferential surface 635 moves while rolling on a contact object, it is possible to reduce a contact area with respect to a bill, a ticket, a contact object, or the like. Accordingly, it is effective to reduce sound (noise) when a bill, a ticket, or the like is conveyed by the outer circumferential surface 635 or the outer circumferential surface 635 moves while rolling on a contact object.

Further, according to the bearing 600 of the seventh embodiment, the second material layer 644 can be firmly engaged with the outer circumferential surface 524 of the outer ring 521 via the first material layer 543. Thus, it is possible to prevent the enveloping layer 608 from being separated from the outer circumferential surface 524 (that is, the outer ring 521) of the outer ring 521.

Further, according to the bearing 600 of the seventh embodiment, like the bearing 510 of the first embodiment, the bearing 600 in which the enveloping layer 608 is formed on the outer circumferential surface 524 of the outer ring 521 can be manufactured in large quantities and at a low cost.

Modified Example

Figure 20:
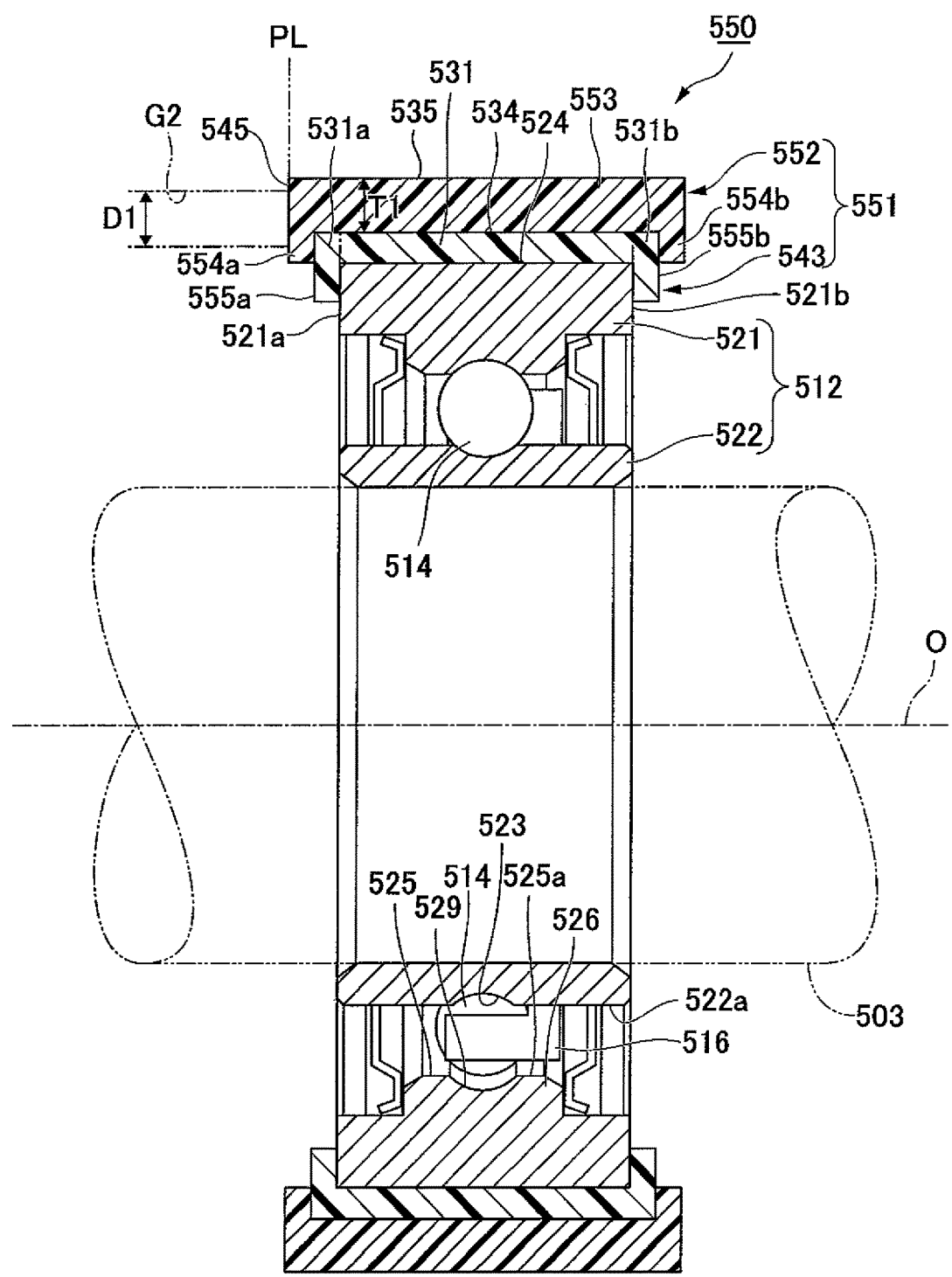
FIG. 20 is a schematic cross-sectional view showing a modified example according to the first embodiment of the second aspect of the present invention.

FIG. 20 is a schematic cross-sectional view of a bearing according to a modified example of the second aspect of the present invention.

As shown in FIG. 20, it is also possible to mold the second material layer 552 of the bearing 550 with a thermoplastic elastomer which is filled from a gate G2 having a large gate diameter D1.

The gate G2 of the mold is formed to have a large gate diameter D1 which has a height larger than the thickness dimension T1 of the second material layer 552 made of a thermoplastic elastomer in the radial direction of the bearing 550. Further, the gate G2 is disposed to overlap both the second material layer 552 and the first material layer 543 when seen in the axial direction.

As an inside (cavity) of the mold is filled with the thermoplastic elastomer supplied from the gate G2, the second material layer 552 is insert-molded on the outer circumferential surface 534 of the first material layer 543.

Since the gate diameter D1 of the gate G2 is formed to be large and the gate G2 is disposed to overlap both the second material layer 552 and the first material layer 543, the second material layer 552 can be favorably formed even when the thickness dimension T1 of the second material layer 552 is reduced.

Further, the outer circumferential surface 534 of the first material layer 543 can be filled with a thermoplastic elastomer with a large pressure. Accordingly, adhesion between both layers of the second material layer 552 and the first material layer 543 can be increased.

The example in which the second material layer 552 of the bearing 550 is molded using the gate G2 having the large gate diameter D1 has been described in the modified example. However, the present invention is not limited thereto. As another example, for example, the second material layers 562, 573, 583 and 593 of the bearings 560, 570, 580 and 590 may be molded by the gate G2 having the large gate diameter D1.

Further, the technical scope of the second aspect of the present invention is not limited to the above-described embodiments, and various modified examples can be made without departing from the gist of the present invention. Furthermore, if necessary, it may be combined with the features of the first aspect or may have features as described in the first aspect.

For example, in the bearings 510, 550, 560, 570, 580, 590 and 600 of the above embodiments, the pair of side surface layers 531*a* and 531*b* of the first material layer 543 cover the entire circumference of both axial side surfaces 521*a* and 521*b* of the outer ring 521. However, it may cover only a part of the circumferential direction of both axial side surfaces 521*a* and 521*b* of the outer ring 521. Further, the bearings may also be configured by combining the above embodiments.

As for application of the bearing 510 of the first embodiment described above, the pair of side surface layers 531*a* and 531*b* of the first material layer 543 rotate and slide the enveloping layer 518 of both axial side surfaces 521*a* and 521*b* of the outer ring 521. However, the bearing of the present invention can also be applied as a member for fixing other members and bearings (a replacement for an O-ring) or an insulating member for preventing electric erosion. In each of the above embodiments, the example in which the enveloping layer is provided on the outer circumferential surface 524 of the outer ring 521 has been described, but the enveloping layer may be provided on the inner circumferential surface of the inner ring 522.

In each of the above embodiments, the example in which the first material layer and the second material layer are formed on the outer ring 521 of the bearings 510, 550, 560, 570, 580, 590 and 600 has been described. However, as another example, for example, the first material layer, the second material layer and the third material layer may be sequentially formed on the outer ring 521. In addition, the second material layer may be formed of a material softer than the first material layer. Further, the third material layer may be formed of a material harder than the second material layer.

Accordingly, it is possible to reduce noise (noise) when the bearing is driven and to realize a bearing excellent in wear resistance and durability.

Further, in the bearings 510, 550, 560, 570, 580, 590 and 600 of each of the above-described embodiments, a groove portion or a wrinkle portion may be formed in the outer circumferential surface 34 of the first material layers 543, 572, 582 and 592. The shape and the number of groove portions can be arbitrarily selected and may be formed, for example, to extend in the axial direction of the bearing. It is possible to increase the bonding strength of the second material layers 544, 552, 562, 573, 583, 593 and 644 to the outer circumferential surface 534 by forming the groove portion or wrinkle portion in the outer circumferential surface 534.

Further, in the bearings 510, 550, 560, 570, 580, 590 and 600 of each of the above-described embodiments, the width dimension of the second material layers 544, 552, 562, 573, 583, 593 and 644 may be smaller than the width dimension of the first material layers 643, 672, 682 and 692. As the width dimension of the second material layer is formed smaller than the width dimension of the first material layer, the contact area can be kept small, and the driving noise can be reduced.

In addition, it is possible to substitute the elements in the above-described embodiment with well-known elements within a scope not deviating from the gist of the present invention, and each of the above-described embodiments and each of the modified examples may be appropriately combined.

A structure with a thermoplastic elastomer enveloping layer capable of manufacturing a large quantity of products at a low cost and a drive module are provided by the present invention. A bearing which has an enveloping layer and a drive module can be manufactured inexpensively in large quantities in the present invention.

1, 501 Moving body
2, 502 Main body portion
3, 41, 503 Support shaft
5, 505 Contact object
10, 70, 90, 110, 130, 140, 510, 550, 560, 570, 580, 590, 600 Bearing
12, 512 Ring body
14, 514 Rolling element
16, 516 Retainer
18, 72, 92, 112, 132, 142, 154, 164, 518, 551, 561, 571, 581, 591, 608 Enveloping layer
21, 521 Outer ring
21*a*, 21*b* End surface of outer ring
22, 522 Inner ring
24, 153, 524 Outer circumferential surface of outer ring (circular outer surface)
24*a* First end edge of outer circumferential surface of outer ring
24*b* Second end edge of outer circumferential surface of outer ring
24*c* First side portion of outer circumferential surface of outer ring
24*d* Second side portion of outer circumferential surface of outer ring
25, 525 Inner circumferential surface of outer ring
25*a*, 525*a* Area (part) of central portion of inner circumferential surface of outer ring
26, 526 Central portion of outer ring
27 One pair of outer side portions of outer ring
28 Groove portion
28*a* Deepest area of groove portion 29, 529 Outer ring rolling surface of inner circumferential surface of outer ring
32, 522a Outer circumferential surface of inner ring
33, 523 Inner ring rolling surface of outer circumferential surface of inner ring
43, 73, 93, 113, 155, 165, 543, 572, 582, 592 First material layer
43a Protruding portion of first material layer
44, 74, 94, 114, 134, 144, 156, 166, 544, 552, 562, 573, 583, 593 Second material layer (including outer circumferential surface layer)
46, 76, 96, 116, 155a, 534 First outer circumferential surface of first material layer (outer surface of first material layer)
47, 77, 97, 117 First inner circumferential surface of first material layer
48, 78, 118 First side surface of first material layer
49, 79, 119 Second side surface of first material layer
52, 82, 122, 146, 175, 553 Outer circumferential surface layer of second material layer
52a One end portion of outer circumferential surface layer
52b The other end portion of outer circumferential surface layer
52c Coated outer circumferential surface of enveloping layer (second material layer)
52d One end of coated outer circumferential surface
53, 54, 83, 84, 123, 124, 176, 177 First and second side surface layers of second material layer (one pair of side surface layers)
53a Inner circumferential surface of first side surface layer of second material layer
53b, 54b, 545 Outer surface of second material layer
54a Inner circumferential surface of second side surface layer of second material layer
55, 547 Gear
57, 548 Gear tooth
76a, 76b One end of outer circumferential surface of first material layer
77a, 77b One end of first inner circumferential surface of first material layer
83a First inner surface of first side surface layer of second material layer
84a Second inner surface of second side surface layer of second material layer
98 First recess surface of first material layer
98a First side surface
98b First circumferential surface
99 Second recess surface of first material layer
99a Second side surface
99b Second circumferential surface
136, 137 Side surface of second material layer
147 Curved coated outer circumferential surface of second material layer
150, 160 Structure
152 Cylindrical member
153 Outer circumferential surface of cylindrical member
162 Flat member
163 Outer surface
165a Outer surface of first material layer (outer circumferential surface of first material layer)
165b First side surface of first material layer
165c Second side surface of first material layer
171 Protrusion of flat member
172 Leg portion of protrusion
172a Distal end of leg portion
173 Extension portion formed at distal end of leg portion
175 Outer circumferential surface layer of second material layer
176 First side surface layer of second material layer
177 Second side surface layer of second material layer
531 Outer circumferential surface layer of first material layer
531a, 531b, 594a, 594b One pair of side surface layers of first material layer
521a, 521b Both axial side surfaces of outer ring
535, 635 Outer circumferential surface of second material layer
554a, 554b, 564a, 564b, 595a, 595b One pair of side surface layers
555a, 555b Both axial side surfaces
574, 584 Projecting portion of first material layer
575, 585 Inner circumferential surface of second material layer
576, 586 Recessed portion of second material layer
635a First end portion of outer circumferential surface
635b Second end portion of outer circumferential surface
D1 Gate diameter
G, G1, G2 Gate used for manufacturing material layer
H1 Height of second material layer
H2 Height of first material layer
L1 Width of groove portion
O Axis of outer ring
PL Parting line of mold
S1 Distance between side surface of first material layer and end edge of outer circumferential surface of outer ring
T1 Thickness of central portion of outer ring
T2 Thickness of outer side portion of outer ring
T3 Thickness of second material layer
W1 Width of first material layer
W2 Width of second material layer
W501, W504 Axial dimension of projecting portion of first material layer
W503 Axial dimension of enveloping layer
W502, W505 Axial dimension of recessed portion of second material layer
θ1 Inclination angle due to side surface of first material layer and outer circumferential surface of outer ring

What is claimed is:
1. A structure with a thermoplastic elastomer enveloping layer, comprising:
at least one of a circular member and a flat member having at least one of a projecting portion and a recessed portion, and
an enveloping layer formed on at least one of an outer surface of the circular member and an outer surface of the flat member,
wherein the enveloping layer comprises
a first material layer provided on at least one of the outer surfaces, and
a second material layer provided on an outer surface of the first material layer,
wherein the second material layer is a thermoplastic elastomer layer thermally bonded to the outer surface of the first material layer and is an outer circumferential surface layer forming an outer circumferential surface of the enveloping layer,
wherein
the second material layer is formed from a material softer than the first material layer,
the first material layer is formed from an amorphous plastic, and the second material layer is formed from a thermoplastic elastomer selected from the group consisting of styrenes, olefins, polyvinyl chlorides, urethanes and polyesters.

2. The structure according to claim 1, wherein
the outer surface of the circular member is an outer circumferential surface of an outer ring provided in a bearing.

3. The structure according to claim 2, wherein
a groove portion configured to extend in a circumferential direction is provided in the outer circumferential surface of the outer ring.

4. The structure according to claim 2, wherein
the second material layer comprises
an outer circumferential surface layer configured to cover the outer surface of the first material layer, and
a pair of side surface layers connected to the outer circumferential surface layer and configured to cover both axial side surfaces of the first material layer.

5. The structure according to claim 4, wherein
the pair of side surface layers of the second material layer are in contact with the outer circumferential surface of the outer ring.

6. The structure according to claim 4, wherein
the first material layer is formed so that a width dimension of the first material layer gradually increases from the outer circumferential surface toward an outer side in a radial direction.

7. A drive module comprising the structure with a thermoplastic elastomer enveloping layer according to claim 2.

8. The structure according to claim 1, wherein the first material layer is formed of a thermoplastic elastomer.

9. The structure according to claim 1, wherein
the outer surface of the circular member is an outer circumferential surface of an outer ring provided in a bearing,
the outer ring is formed of an amorphous plastic, and
the enveloping layer is a layer formed by thermally fusing a thermoplastic elastomer on an outer circumferential surface of the outer ring.

10. The structure according to claim 1, wherein the second material layer is a layer formed of a thermoplastic elastomer filled from a gate of a mold, and
the gate is formed to have an opening larger than a thickness dimension of the second material layer and is disposed to overlap both the first material layer and the second material layer in an axial direction.

11. The structure according to claim 1, wherein the amorphous plastic is at least one selected from the group consisting of polycarbonate, ABS resin and an alloy material of polycarbonate and ABS resin.

12. A bearing comprising:
an outer ring, and
an enveloping layer formed on an outer circumferential surface of the outer ring,
wherein the enveloping layer comprises
a first material layer formed on the outer circumferential surface of the outer ring, and
a second material layer which is a thermoplastic elastomer layer thermally bonded to an outer surface of the first material layer and is an outer circumferential surface layer forming an outer circumferential surface of the enveloping layer,
the second material layer is made of a material which is softer than the first material layer, and
the first material layer comprises an outer circumferential surface layer configured to cover the outer circumferential surface of the outer ring, and a pair of side surface layers connected to both axial sides of the outer circumferential surface layer and configured to cover both axial side surfaces of the outer ring, and
wherein
the first material layer is formed from an amorphous plastic, and
the second material layer is formed from a thermoplastic elastomer selected from the group consisting of styrenes, olefins, polyvinyl chlorides, urethanes and polyesters.

13. The bearing according to claim 12, wherein
the second material layer comprises
an outer circumferential surface layer configured to cover an outer circumferential surface of the first material layer, and
a pair of side surface layers connected to both axial sides of the outer circumferential surface layer and configured to cover both axial side surfaces of the pair of side surface layers of the first material layer.

14. The bearing according to claim 13, wherein
the pair of side surface layers of the second material layer cover both axial side surfaces of the outer ring.

15. The bearing according to claim 12, wherein
a projecting portion is formed on one of an outer circumferential surface of the first material layer and an inner circumferential surface of the second material layer, and
a recessed portion engageable with the projecting portion is formed on the other of the outer circumferential surface of the first material layer and the inner circumferential surface of the second material layer on which the projecting portion is not formed.

16. The bearing according to claim 15, wherein
the projecting portion is formed on the outer circumferential surface of the first material layer,
the recessed portion is formed in the inner circumferential surface of the second material layer,
an axial dimension of the projecting portion is formed to increase from a radially inner side toward a radially outer side, and
an axial dimension of the recessed portion is formed to increase from the radially inner side toward the radially outer side in correspondence with the projecting portion.

17. The bearing according to claim 12, wherein the pair of side surface layers of the first material layer cover both axial side surfaces of the outer ring over an entire circumference.

18. The bearing according to claim 12, wherein the first material layer is formed so that an axial dimension of the first material layer gradually increases from an outer circumferential surface of the outer ring toward a radially outer side.

19. The bearing according to claim 12, wherein the second material layer is formed of a thermoplastic elastomer filled from a gate of a mold, and
the gate is formed to have an opening larger than a thickness dimension of the second material layer and disposed to overlap both the second material layer and the first material layer in an axial direction, and thus the second material layer is formed.

20. A drive module comprising the bearing according to claim 12.

21. A bearing comprising:

an outer ring, and an enveloping layer formed on an outer circumferential surface of the outer ring, wherein the enveloping layer comprises a first material layer formed on the outer circumferential surface of the outer ring, and a second material layer which is a thermoplastic elastomer layer thermally bonded to an outer surface of the first material layer and is an outer circumferential surface layer forming an outer circumferential surface of the enveloping layer, the second material layer is made of a material which is softer than the first material layer, and the first material layer comprises an outer circumferential surface layer configured to cover the outer circumferential surface of the outer ring, and a pair of side surface layers connected to both axial sides of the outer circumferential surface layer and configured to cover both axial side surfaces of the outer ring, wherein the second material layer comprises an outer circumferential surface layer configured to cover an outer circumferential surface of the first material layer, and a pair of side surface layers connected to both axial sides of the outer circumferential surface layer and configured to cover both axial side surfaces of the pair of side surface layers of the first material layer, and wherein an axial dimension between an outer surface of one side surface layer and an outer surface of the other side surface layer of the pair of side surface layers of the first material layer is formed to increase from a radially inner side toward a radially outer side, and an axial dimension between an inner surface and an inner surface of the pair of the other side surface layer of side surface layers of the second material layer is formed to increase from the radially inner side toward the radially outer side in correspondence with the pair of side surface layers of the first material layer.

* * * * *